(12) United States Patent
Islam

(10) Patent No.: US 8,036,252 B2
(45) Date of Patent: Oct. 11, 2011

(54) MID-INFRARED FIBER LASER USING CASCADED RAMAN WAVELENGTH SHIFTING

(75) Inventor: Mohammed N. Islam, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 477 days.

(21) Appl. No.: 12/132,382

(22) Filed: Jun. 3, 2008

(65) Prior Publication Data

US 2009/0296743 A1 Dec. 3, 2009

(51) Int. Cl.
*H01S 3/30* (2006.01)
(52) U.S. Cl. ..................... 372/3; 372/4; 372/6
(58) Field of Classification Search .................. 372/3, 4, 372/6, 21, 22
See application file for complete search history.

(56) References Cited

U.S. PATENT DOCUMENTS

| | | |
|---|---|---|
| 5,323,404 A | 6/1994 | Grubb |
| 5,623,508 A | 4/1997 | Grubb et al. |
| 5,867,305 A | 2/1999 | Waarts et al. |
| 6,043,927 A | 3/2000 | Islam |
| 6,381,391 B1 | 4/2002 | Islam et al. |
| 6,480,656 B1 | 11/2002 | Islam et al. |
| 6,549,702 B2 | 4/2003 | Islam et al. |
| 6,567,430 B1 | 5/2003 | Islam et al. |
| 6,603,910 B2 | 8/2003 | Islam et al. |
| 7,259,906 B1 | 8/2007 | Islam |
| 2006/0000988 A1* | 1/2006 | Stuart et al. ............... 250/504 R |
| 2006/0245461 A1 | 11/2006 | Islam |
| 2006/0268393 A1 | 11/2006 | Islam |

OTHER PUBLICATIONS

Aaviksoo, et al., "Observation of optical precursors at pulse propagation in GaAs", Physical Review A, 44(9):R5353-R5356 (1991).
Abeeluck, et al., "Continuous-wave pumping in the anomalous- and normal-dispersion regimes of nonlinear fibers for supercontinuum generation", Optics Letters, 30(1):61-63 (2005).
Asobe, "Nonlinear Optical Properties of Chalcogenide Glass Fibers and Their Application to All-Optical Switching", Optical Fiber Technology, 3:142-148 (1997).

(Continued)

*Primary Examiner* — Armando Rodriguez
(74) *Attorney, Agent, or Firm* — Marshall, Gerstein & Borun LLP

(57) ABSTRACT

A mid-infrared system for optical probing is disclosed that comprises a mid-infrared fiber laser based on cascaded Raman wavelength shifting, a sample volume, and a detector or detection system. The cascaded Raman wavelength shifting process in optical fibers involves the emission of a plurality of optical phonons for at least some of the pump photonics involved in the process. As one example, using the cascaded Raman wavelength shifting process a pump laser wavelength between 1 and 2 μm can be shifted down to between 2.5 to 10 μm. In one embodiment, the mid-infrared fiber laser comprises a pump laser with a wavelength between 1 and 2 μm, one or more stages of cascaded Raman oscillators implemented in fused silica fiber, and one or more stages of cascaded Raman oscillators implemented in mid-infrared fiber that transmits beyond 2 μm. Examples of mid-infrared fibers include chalcogenides, fluorides and tellurite fibers. The output wavelength from the mid-infrared fiber laser is at an exemplary wavelength longer than 2.5 μm. The mid-infrared optical probing system can be used in applications such as semiconductor process control, combustion monitoring for engines, and defense or homeland security applications such as chemical sensing and infrared counter-measures.

11 Claims, 20 Drawing Sheets

OTHER PUBLICATIONS

Asobe, et al., "Third-order nonlinear spectroscopy in $As_2S_3$ chalcogenide glass fibers," J. Appl. Phys. 77(11):5518-5523 (1995).
Avdokhin, et al., "Continuous-wave, high-power, Raman continuum generation in holey fibers", Optics Letters, 28(15):1353-1355 (2003).
Beck, et al., "Continuous Wave Operation of a Mid-Infrared Semiconductor Laser at Room Temperature," Science 295:301-305 (2002).
Bizheva, et al., "Compact, broad-bandwidth fiber laser for sub-2-µm axial resolution optical coherence tomography in the 1300-nm wavelength region", Optics Letters, 28(9):707-709 (2003).
Boppart, et al., "Imaging developing neural morphology using optical coherence tomography", Journal of Neuroscience Methods 70:65-72 (1996).
Boppart, et al., "Noninvasive assessment of the developing Xenopus cardiovascular system using optical coherence tomography," Proc. Natl. Sci. USA, 94:4256-4261 (1997).
Borrelli, et al., "Resonant and non-resonant effects in photonic glasses", Journal of Non-Crystalline Solids 185:109-122 (1995).
Boult, et al., "Systematic Review of Percutaneous Endoscopic Laser Discectomy: Update and Re-appraised 2000", Australian Safety and Efficacy Register of New Interventional Procedures—Surgical Report No. 5, 49 pages (2000).
Busse, et al., "Design Parameters for Fluoride Multimode Fibers", Journal of Lightwave Technology, 9(7):828-831 (1991).
Camacho, et al., "FTIR Microscopic Imaging of Collagen and Proteoglycan in Bovine Cartilage," Biopolymers (Biospectroscopy), 62:1-8 (2001).
Cardinal, et al., "Non-linear optical properties of chalcogenide glasses in the system As—S—Se", Journal of Non-Crystalline Solids 256&257:353-360 (1999).
Champert, et al., "White-light supercontinuum generation in normally dispersive optical fiber using original multi-wavelength pumping system", Optics Express, 12(19):4366-4371 (2004).
Choi, et al. "Observation of Optical Precursors in Water", Physical Review Letters, 92(19):193903-1-193903-3 (2004).
Choi, et al., "Thermal, Mechanical, Optical, and Morphologic Changes in Bovine Nucleus Pulposus Induced by Nd:YAG ($\lambda$ = 1.32 µm) Laser Irradiation", Lasers in Surgery and Medicine, 28:248-254 (2001).
Coen, et al., "Supercontinuum generation by stimulated Raman scattering and parametric four-wave mixing in photonic crystal fibers", J. Opt. Soc. Am. B. 19(4):753-764 (2002).
D'Amico, et al., "Optical Coherence Tomography as a Method for Identifying Benign and Malignant Microscopic Structures in the Prostate Gland", Urology 55(5):783-787 (2000).
de Boer, et al., "Determination of the depth-resolved Stokes parameters of light backscattered from turbid media by use of polarization-sensitive optical coherence tomography", Optics Letters, 24(5):300-302 (1999).
de Boer, et al., "Imaging thermally damaged tissue by polarization sensitive optical coherence tomography", Optics Express 212, 3(6):212-218 (1998).
Demircan, et al. "Supercontinuum generation by the modulation instability", Optics Communications 244:181-185 (2005).
Desthieux, et al., "111 kW (0.5 mJ) pulse amplification at 1.5 µm using a gated cascade of three erbium-doped fiber amplifiers," Appl. Phys. Lett. 63:586-588 (1993).
Drexler, "In vivo ultrahigh-resolution optical coherence tomography", Optics Letters, 24(17):1221-1223 (1999).
Dubois, "Three-dimensional cellular-level imaging using full-field optical coherence tomography", Phys. Med. Biol. 49:1227-1234 (2004).
Dudley, et al., "Supercontinuum generation in air-silica microstructured fibers with nanosecond and femtosecond pulse pumping," J. Opt. Soc. Am. B. 19(4):765-771 (2002).
Edwards, et al., "Advantage of the Mark-III FEL for biophysical research and biomedical applications", J. Synchrotron Rad. 10:354-357 (2003).
Edwards, et al., "Tissue ablation by a free-electron laser tuned to the amide II band", Nature 371:416-419 (1994).
Edwards, et al., Review Article, "Free-electron-laser-based biophysical and biomedical instrumentation", Review of Scientific Instruments, 74(7):3207-3245 (2003).
Falk, et al., "Supercontinuum generation in a photonic crystal fiber with two zero-dispersion wavelengths tapered to normal dispersion at all wavelengths", Optics Express, 13(19):7535-7540 (2005).
Faralli, et al., "Impact of Double Rayleigh Scattering Noise in Distributed Higher Order Raman Pumping Schemes", IEEE Photonics Technology Letters, 15(6):804-806 (2003).
Fedotova, et al., "Supercontinuum generation in planar rib waveguides enabled by anomalous dispersion," Optics Express, 14(4):1512-1517 (2006).
Genty, et al., "Enhanced bandwidth of supercontinuum generated in microstructured fibers", Optics Express, 12(15):3471-3480 (2004).
Genty, et al., "Supercontinuum generation in large mode-area microstructured fibers", Optics Express, 13(21):8625-8633 (2005).
Hafez, et al., "The Effect of Irrigation on Peak Temperatures in Nerve Root, Dura, and Intervertebral Disc During Laser-Assisted Foraminoplasty", Lasers in Surgery and Medicine, 29:33-37 (2001).
Hagen, et al. "Generation of a Continuum Extending to the Midinfrared by Pumping ZBLAN Fiber with an Ultrafast 1550-nm Source", IEEE Photonics Technology Letters, 18(1):91-93 (2006).
Hamilton, et al., "High Frequency Optoacoustic Arrays Using Etalon Detection", IEEE Transactions on Ultrasonics, Ferroelectrics, and Frequency Control, 47(1):160-169 (2000).
Hamilton, et al., "High Frequency Ultrasound Imaging Using an Active Optical Detector", IEEE Transactions on Ultrasonics, Ferroelectrics, and Frequency Control, 45(3):719-727 (1998).
Hamilton, et al., "High Frequency Ultrasound Imaging with Optical Arrays", IEEE Transactions on Ultrasonics, Ferroelectrics, and Frequency Control, 45(1):216-235 (1998).
Harbold, "Highly nonlinear As—S—Se glasses for all-optical switching", Optics Letters 27(2):119-121 (2002).
Harbold, et al., "Highly Nonlinear Ge—As—Se and Ge—As—S—Se Glasses for All-Optical Switching", IEEE Photonics Technology Letters, 14(6):822-824 (2002).
Harrington, "Infrared Fiber Optics" (2001).
Hilligsoe, et al., "Supercontinuum generation in a photonic crystal fiber with two zero dispersion wavelengths," Optics Express, 12(6):1045-1054 (2004).
Hori, et al., "Experimental and numerical analysis of widely broadened supercontinuum generation in highly nonlinear dispersion-shifted fiber with a femtosecond pulse", J. Opt. Soc. Am. B, 21(11):1969-1980 (2004).
Hori, et al., "Flatly broadened, wideband and low noise supercontinuum generation in highly nonlinear hybrid fiber," Optics Express, 12(2):317-324 (2004).
Husakou, et al., "Supercontinuum generation, four-wave mixing, and fission of higher-order solitons in photonic-crystal fibers", J. Opt. Soc. Am. B, 19(9):2171-2182 (2002).
Iatridis, et al., "Is the Nucleus Pulposus a Solid or a Fluid? Mechanical Behaviors of the Nucleus Pulposus of the Human Intervertebral Disc", Spine, 21(10):1174-1184 (1996).
Inoue, et al., "Computer simulation of the vibrational spectra and properties of fluoride glasses based on $ZrF_4$", Journal of Non-Crystalline Solids, 161:118-122 (1993).
Islam, et al., "Broad bandwidths from frequency-shifting solitons in fibers", Optics Letters, 14(7):370-372 (1989).
Islam, et al., "Femtosecond distributed soliton spectrum in fibers", J. Opt. Soc. Am. B, 6(6):1149-1158 (1989).
Jackson, et al., "Chalcogenide glass Raman fiber laser," Appl. Phys. Lett. 88:221106-1-221106-3 (2006).
Jackson, et al., "Theory and numerical simulation of nth-order cascaded Raman fiber lasers", J. Opt. Soc. Am. B, 18(9):1297-1306 (2001).
Jarman, "Novel optical fiber lasers", Current Opinion in Solid State and Materials Science 1:199-203 (1996).
Kikineshi, et al., "Material dispersion in $(As_2S_3) \times (AsI_3)1$-xglasses," SPIE 3890:502-506 (1999).
Kobtsev, et al., "Modelling of high-power supercontinuum generation in highly nonlinear, dispersion shifted fibers at CW pump," Optics Express, 13(18):6912-6918 (2005).

Kowalevicz, "Ultrahigh resolution optical coherence tomography using a superluminescent light source", Optics Express 10(7):349-353 (2002).

Kumar, et al., "Extruded soft glass photonic crystal fiber for ultrabroad supercontinuum generation", Optics Express 10(25):1520-1525 (2002).

Kutz, et al., "Enhanced Supercontinuum Generation through Dispersion-Management", Optics Express, 13(11):3989-3998 (2005).

Lee, et al., "Continuous-wave supercontinuum laser based on an erbium-doped fiber ring cavity incorporating a highly nonlinear optical fiber", Optics Letters, 30(19):2599-2601 (2005).

Lee, et al., "Experimental performance comparison for various continuous-wave supercontinuum schemes: ring cavity and single pass structures," Optics Express, 13(13):4848-4853 (2005).

Leon-Saval, et al., "Supercontinuum generation in submicron fibre waveguides", Optics Express, 12(13):2864-2869 (2004).

Li, et al., "Imaging needle for optical coherence tomography", Optics Letters, 25(20):1520-1522 (2000).

Lines, "Ultralow-Loss Glasses," Annu. Rev. Mater. Sci. 16:113-135 (1986).

Lucas, "Infrared glasses", Current Opinion in Solid State & Materials Science 4:181-187 (1999).

Maddern, et al. "Evaluating New Surgical Techniques in Australia: The Australian Safety and Efficacy Register of New Interventional Procedures-Surgical Experience," Surg. Clin. N. Am. 86:115-128 (2006).

Mizunami, et al., "Gain saturation characteristics of Raman amplification in silica and fluoride glass optical fibers", Optics Communications 97:74-78 (1993).

Moon, et al., "Generation of octave-spanning supercontinuum with 1550-nm amplified diode-laser pulses and a dispersion-shifted fiber", Optics Express, 14(1):270-278 (2006).

Maussot, et al., "Generation of a broadband single-mode supercontinuum in a conventional dispersion-shifted fiber by use of a subnanosecond microchip laser", Optics Letters, 28(19):1820-1822 (2003).

Nassif, et al., "In vivo high-resolution video-rate spectral-domain optical coherence tomography of the human retina and optic nerve", Optics Express, 12(3):367-376 (2004).

Nicholson, "Supercontinuum generation in ultraviolet-irradiated fibers", Optics Letters, 29(20):2363-2365 (2004).

Nicholson, et al., "All-fiber, octave-spanning supercontinuum", Optics Letters, 28(8):643-645 (2003).

Nicholson, et al., "High power, single mode, all-fiber source of femtosecond pulses at 1550 nm and its use in supercontinuum generation," Optics Express, 12(13):3025-3034 (2004).

Nicholson, et al., "Pulsed and continuous-wave supercontinuum generation in highly nonlinear, dispersion-shifted fibers", Applied Physics B 77:211-218 (2003).

Nishida, et al., "Reliability of Fluoride Fiber Module for Optical Amplifier Use", IEEE Photonics Technology Letters, 11(12):1596-1598 (1999).

Nowak, et al., "Low-power high-efficiency wavelength conversion based on modulational instability in high-nonlinearity fiber," Optics Letters 23(12):936-938 (1998).

Nowak et al., "Stable supercontinuum generation in short lengths of conventional dispersion-shifted fiber", Applied Optics 38(36):7364-7369 (1999).

Oughstun, "Influence of precursor fields on ultrashort pulse autocorrelation measurements and pulse width evolution", Optics Express, 8(8):481-491 (2001).

Pan et al., "Hand-held arthroscopic optical coherence tomography for in vivo high-resolution imaging of articular cartilage", Journal of Biomedical Optics, 8(4):648-654 (2003).

Papernyi, et al., "Sixth-Order Cascaded Raman Amplification," OFC/NFOEC, 3 pages (2005).

Park, et al., "Analysis of birefringent image in the retinal nerve fiber layer by polarization sensitive optical coherence tomography", Ophthalmic Technologies XIV, Proceedings of SPIE, 5314:188-194 (2004).

Pierce, "Advances in Optical Coherence Tomography Imaging for Dermatology", J. Invest Dermatol 123:458-463 (2004).

Povazay, et al., "Submicrometer axial resolution optical coherence tomography", Optics Letters, 27(20):1800-1802 (2002).

Ranka, et al., "Visible continuum generation in air-silica microstructure optical fibers with anomalous dispersion at 800 nm", Optics Letters, 25(1):25-27 (2000).

Roggan, et al., "Optical Properties of Circulating Human Blood in the Wavelength Range 400-2500 NM", Journal of Biomedical Optics, 4(1):36-46 (1999).

Rollins, et al., "Real-time in vivo imaging of human gastrointestinal ultrastructure by use of endoscopic optical coherence tomography with a novel efficient interferometer design", Optics Letters, 24(19):1358-1360 (1999).

Rong, et al., "A cascaded silicon Raman laser," Nature Photonics 2:170-174 (2008).

Saliminia, et al., "Ultra-broad and coherent white light generation in silica glass by focused femtosecond pulses at 1.5μm", Optics Express, 13(15):5731-5738 (2005).

Sanghera, et al., "Active and passive chalcogenide glass optical fibers for IR applications: a review", Journal of Non-Crystalline Solids 256&257:6-16 (1999).

Schmitt, et al. "Intravascular Optical Coherence Tomography Opens a Window Onto Coronary Artery Disease", Optics & Photonics News, pp. 20-25 (2004).

Schreiber, et al., "Supercontinuum generation by femtosecond single and dual wavelength pumping in photonic crystal fibers with two zero dispersion wavelengths", Optics Express, 13(23):9556-9569 (2005).

Seefeldt, et al., "Compact white-light source with an average output power of 2.4 W and 900 nm spectral bandwidth", Optics Communications 216:199-202 (2003).

Slusher, et al., "Highly nonlinear composite chalcogenide/polymer fibers", OSA, 1 page (2004).

Slusher, et al., "Large Raman gain and nonlinear phase shifts in high-purity $As_2Se_3$ chalcogenide fibers", J. Opt. Soc. Am. B, 21(6):1146-1155 (2004).

Smektala, et al. "Non-linear optical properties of chalcogenide glasses measured by Z-scan," Journal of Non-Crystalline Solids 239:232-237 (2000).

Sobol, et al., "Time-resolved, light scattering measurements of cartilage and cornea denaturation due to free electron laser radiation", Journal of Biomedical Optics 8(2):216-222 (2003).

"State-Specific Trends in Chronic Kidney Failure—United States, 1990-2001", Morbidity and Mortality Weekly Report, Department of Health and Human Services Centers for Disease Control and Prevention, 53(39):918-920 (2004).

Takushima, "High average power, depolarized super-continuum generation using a 1.55 μm ASE noise source," Optics Express, 13(15):5871-5877 (2005).

Tanaka, "Optical nonlinearity in photonic glasses", Journal of Materials Science: Materials in Electronics 16:633-643 (2005).

Tearney, et al., "In vivo Endoscopic Optical Biopsy with Optical Coherence Tomography", Science, New Series, 276:2037-2039 (1997).

Thielen, et al., "Small-core As—Se fiber for Raman amplification", Optics Letters, 28(16):1406-1408 (2003).

Thongtrangan, et al., "Minimally invasive spinal surgery: a historical perspective", Neurosurg. Focus, 16(1):1-14 (2004).

Tombelaine, et al., "Ultra wide band supercontinuum generation in air-silica holey fibers by SHG-induced modulation instabilities," Optics Express, 13(19):7399-7404 (2005).

Travers, "Extended blue supercontinuum generation in cascaded holey fibers", Optics Letters, 30(23):3132-3134 (2005).

Travers, et al., "Extended continuous-wave supercontinuum generation in a low-water-loss hole fiber", Optics Letters, 30(15):1938-1940 (2005).

Unterhuber, et al., "Advances in broad bandwidth light sources for ultrahigh resolution optical coherence tomography", Physics in Medicine and Biology, Phys. Med. Biol. 49:1235-1246 (2004).

Urban, et al., "The Nucleus of the Intervertebral Disc from Development to Degeneration," Amer. Zool., 40:53-61 (2000).

Venugopalan, "Optical Society of America BIOMED Topical Meeting Tutorial on Tissue Optics", pp. 1-32 (2004).

Wadsworth, et al., "Supercontinuum and four-wave mixing with Q-switched pulses in endlessly single-mode photonic crystal fibers," Optics Express, 12(2):299-309 (2004).

Wadsworth, et al., "Supercontinuum generation in photonic crystal fibers and optical fiber tapers: a novel light source," J. Opt. Soc. Am. B, 19(9):2148-2155 (2002).

Wang, et al., "Ultrahigh-resolution optical coherence tomography by broadband continuum generation from a photonic crystal fiber", Optics Letters, 28(3):182-184 (2003).

Wei, et al., "Spectral broadening of femtosecond pulses in a single-mode As-S glass fiber," Opt. Express 13, 2439-2443 (2005).

Werle, et al., "Near- and mid-infrared laser-optical sensors for gas analysis", Optics and Lasers in Engineering, 37:101-114 (2002).

Westbrook, "Improved Supercontinuum Generation Through UV Processing of Highly Nonlinear Fibers", Journal of Lightwave Technology, 23(1):13-18 (2005).

Wuthrich, et al., "Optical damage thresholds at 2.94 μm in fluoride glass fibers", Applied Optics 31(27):5833-5837 (1992).

Xia, et al. "Mid-infrared supercontinuum generation to 4.5 μm in ZBLAN fluoride fibers by nanosecond diode pumping," Optics Letters 31(17):2553-2555 (2006).

Xia, et al., "Power scalable mid-infrared supercontinuum generation in ZBLAN fluoride fibers with up to 1.3 watts time-averaged power," Optics Express 15(3):865-871 (2007).

Xia, et al., "Supercontinuum Generation in Silica Fibers by Amplified Nanosecond Laser Diode Pulses," IEEE Journal of Selected Topics in quantum Electronics, 13(3):789-797 (2007).

Xie et al., "Endoscopic optical coherence tomography with a modified microelectromechanical systems mirror for detection of bladder cancers", Applied Optics, 42(31):6422-6426 (2003).

Xie, et al., "Detection of tumorigenesis in urinary bladder with optical coherence tomography: optical characterization of morphological changes", Optics Express, 10(24):1431-1443 (2002).

\* cited by examiner

MID-INFRARED FIBER LASER USING CASCADED RAMAN WAVELENGTH SHIFTING

TECHNICAL FIELD OF THE INVENTION

This invention generally relates to mid-infrared laser systems and, more particularly, to a system and method for generating mid-infrared light using fiber optic technologies.

BACKGROUND AND OVERVIEW

Various laser sources exist for producing radiation in the mid-infrared (mid-IR) region. The earliest mid-IR semiconductor lasers, for example, used lead salts operating at cryogenic temperatures to produce output wavelengths ranging from 3 to 30 µm. These lasers were limited to relatively low output power levels and exhibited wide variations in emission characteristics, particularly from thermal cycling. As a result, researchers began focusing on Antimonide based laser sources, quantum cascade (QC) laser sources, and optical parametric oscillators (OPOs) as more viable alternatives.

Although there has been significant mid-IR laser development in the past few years, particularly in QC lasers and OPOs, a number of problems persist. For instance, OPO's are bulky and require a large pump laser and moving parts. QC lasers have relatively low efficiency, requiring strict temperature control and in some instances cryogenic temperatures for high power operation. QC lasers also operate at wavelengths longer than 4.2 µm near room temperature, and thus do not sufficiently cover the entire mid-IR wavelength range.

In contrast, mid-IR sources based on the cascaded Raman shifting process exhibit some distinct advantages, including the maturity of underlying technology, simple modulation and wavelength tuning, and excellent beam quality with $M^2 < 1.4$ (using single spatial mode in fiber), where the $M^2$ factor is the beam quality factor, or beam propagation factor, defined as the beam parameter product divided by $\lambda/\pi$ These mid-IR sources have been implemented in fiber-based systems that offer additional advantages such as robustness, compactness, lightweight, ease of use, room temperature operation over a flexible repetition rate, a wide wavelength range from 1-6.5 µm or longer, and very high efficiency (close to quantum limit). Compared with QC lasers, cascaded Raman shifting sources offer a larger tuning range, better beam quality, room temperature operation with flexible repetition rate, scalability to high powers, and higher efficiency. Compared with OPO's, cascaded Raman shifting sources offer a more mature underlying technology, better beam quality, the advantages of fiber-based systems, and a wider wavelength range with better efficiency.

While cascaded Raman shifting sources have been proposed, the state of the art sources are limited in operation and commercial application. Some have proposed cascaded Raman shifting apparatuses designed to shift a single pump signal from one mid-IR wavelength to a different mid-IR wavelength. Yet, because of the varying attenuation characteristics of Raman shifting materials, no single material can be used to cover the entire mid-IR spectral range, which limits the reach of Raman sources. Furthermore, even where techniques have been developed to provide numerous Raman orders in a single cascaded Raman stage, the output is limited to the fully converted, final Raman order. That is, effective techniques for taping different Raman shifted orders during the entire conversation process have not been attained. Some have proposed using a coupler with a single Raman process stage, but such configurations nonetheless limit the output from a mid-IR laser source and they limit the applications that might otherwise benefit from such a source. This limitation is particular noticeable in applications like countermeasures where a supercontinuum produced laser source may be undesirable over a discrete characteristic spectrum.

SUMMARY OF EXAMPLE EMBODIMENTS

In one embodiment, a system for mid-infrared probing comprises a mid-infrared fiber laser coupled to a sample volume and a detector. The mid-infrared fiber laser comprises a pump laser with a pump wavelength between 1 and 2 µm, a wavelength shifter coupled to the pump laser, wherein the wavelength shifter comprises one or more optical fibers, where at least one of the optical fibers is capable of transmitting at an output laser with an optical wavelength longer than 2 µm, and wherein the pump wavelength is shifted to an output wavelength longer than 2.5 µm by a cascaded Raman wavelength shifting process in at least one of the optical fibers. As a result, optical phonons may be emitted for at least some of the pump laser photons involved in the cascaded Raman wavelength shifting process in the one or more optical fibers. The sample volume is capable of transmitting the output wavelength from the mid-infrared fiber laser, and the detector is capable of receiving at least a fraction of the output wavelength after transmitting through at least a portion of the sample volume.

In another embodiment, a method includes generating a pump source having a wavelength between 1 and 2 µm, shifting the pump to an output source having a wavelength longer than 2.5 µm through a cascaded Raman wavelength process in one or more optical fibers, transmitting the output source through at least a portion of the sample volume, and detecting the output source after transmitting through at least the portion of the sample volume. The cascaded Raman wavelength shifting process emits a plurality of optical phonons in response to pump photons involved in the cascaded Raman wavelength shifting process in one or more optical fibers, wherein at least one of the optical fibers is capable of transmitting optical wavelengths longer than 2 µm.

In another embodiment, a mid-infrared light source comprises a pump laser coupled to a first stage cascaded Raman wavelength shifter and a second stage cascaded Raman wavelength shifter. The pump laser is capable of generating more than 10 W of peak power at a pump wavelength between 1 and 2 µm. The first stage cascaded Raman wavelength shifter comprises a first set of one or more cascaded Raman oscillators, each having a fiber grating and a length of fused silica fiber, wherein the first stage shifts the pump wavelength to beyond 2 µm. The second stage cascaded Raman wavelength shifter comprises a second set of one or more cascaded Raman oscillators, each having at least one reflector and a length of a second fiber that transmits light at a wavelength greater than 2 µm, and wherein the second stage cascaded Raman λ shifter shifts the pump wavelength to beyond 2.5 µm.

Various embodiments may be capable of serving as a mid-infrared light source in systems for semiconductor process control, combustion monitoring, and infrared counter-measures. Some embodiments may be capable of generating time averaged output powers of 10 W or more; some embodiments may have more than one output wavelength or be tunable in wavelength; some embodiments may be pumped, producing a pulsed output; some embodiments may produce continuous wave output.

Other technical aspects will be readily apparent to one skilled in the art from the following figures, description and claims.

BRIEF DESCRIPTION OF THE DRAWINGS

FIG. 11A is of a first fiber transitioning to 2.5 µm; where FIG. 11B is of a second fiber transitioning to 3.5 µm; and where FIG. 11C is of a third fiber transitioning to close to 4.5 µm.

DETAILED DESCRIPTION OF EXAMPLE EMBODIMENTS

Figure 1:
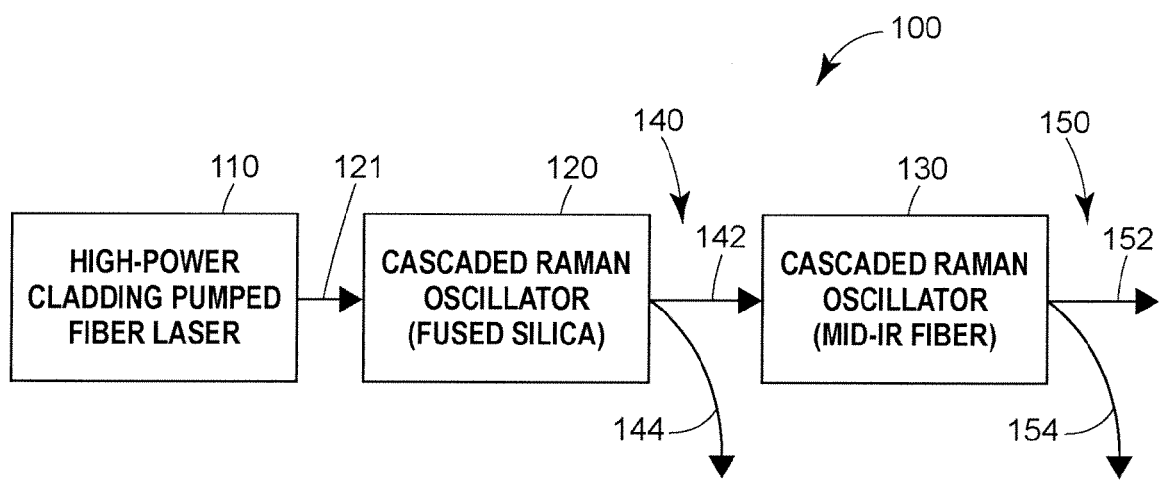
FIG. 1 is a block diagram of a mid-infrared fiber laser using a pump laser followed by one or more stages of cascaded Raman oscillators.
Figure 2:
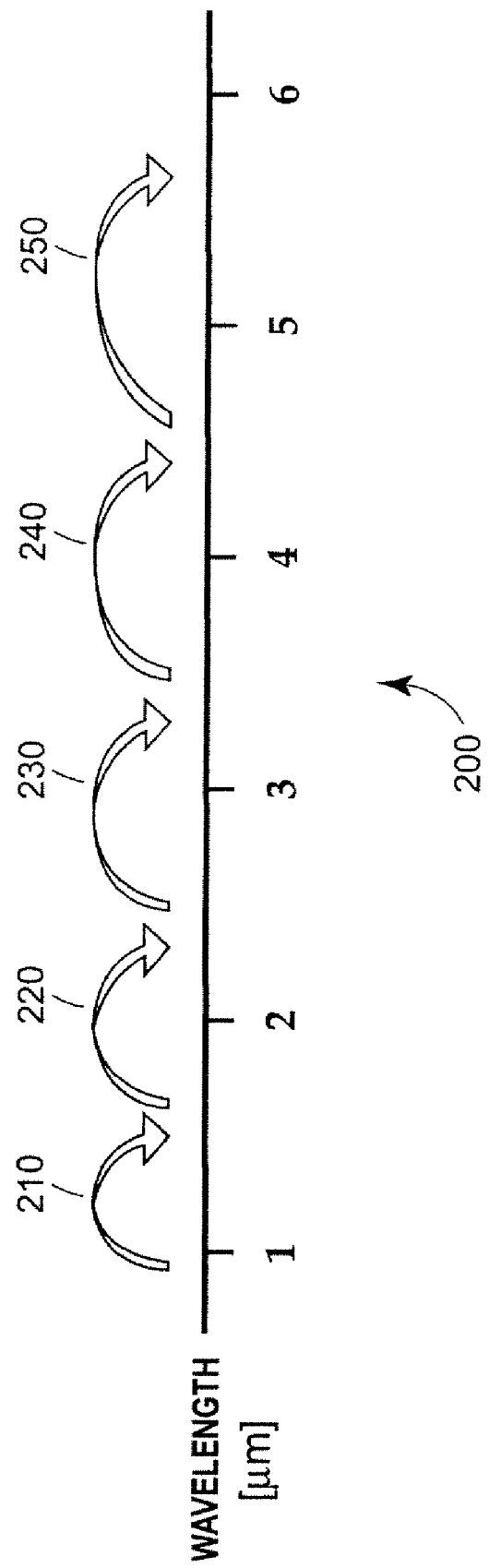
FIG. 2 illustrates the down shifting of a pump source wavelength using a cascaded Raman wavelength shifting process.

An example configuration for a fiber laser 100 capable of transmitting laser light in the mid-IR region is illustrated in FIG. 1. A high-power, cladding-pumped fiber (CPF) laser 110 produces a pump beam, e.g., in the ~1-2 µm wavelength region. The pump laser 110 may be coupled to one or more stages of cascaded Raman oscillators (CROs) 120, 130 for continuous wave (cw) operation using this pump beam. In another example, the pump laser 110 may be coupled to an open-loop Raman wavelength shifter, such as a length of fiber, for pulsed operation. In either case, a Raman effect results from the strong pump beam coupled into the fibers forming the CRs 120, 130, where the vibrating glass matrix of those fibers emit vibrational modes called optical phonons. The Raman effect inside these fibers provides gain to longer wavelengths. This Raman effect is generally self-phase matched and hence does not generally require tuning. Further, the effect is generally independent of wavelength, although the gain coefficient does scale inversely with wavelength. One attribute of the Raman effect is that a number of optical phonons can be emitted in response to the pump laser beam, or the wavelength of that pump laser can be sequentially shifted down through a cascaded Raman process to longer and longer wavelengths as shown in FIG. 2 through wavelength transition 210, 220, 230, 240, 250. In other words, the cascaded Raman process can mean that at least some of the pump photons involved in the wavelength down-shifting process emit a plurality of optical phonons.

For pulsed pump lasers, the peak laser power should be high enough to have efficient Raman wavelength shifting even with open loop (i.e., straight length) fibers. However, for cw pump sources, the efficiency of the Raman process can be enhanced by using oscillators to multi-pass the pump and the various cascaded orders. However, more generally a pulsed or cw pump may be used either with open loop systems or oscillators.

In FIG. 1, the pump laser 110 is coupled to the CRO 120 using a near-IR or mid-IR fiber 121 such as a fused silica fiber that is coupled to the fused silica fiber (or forms part thereof) that forms the CRO 120. The cascaded Raman wavelength shifting will occur in a fiber of sufficient length, that is until the fiber loss becomes prohibitive. In the case of fused silica fibers, the loss climbs exponentially for wavelengths above 1.8 µm due to vibrational absorption. The mid-IR energy from the CRO 120 will typically be in the maximum wavelength range for silica, approximately 2.3 µm to approximately 3 µm. The CRO 120 is coupled to a fiber coupler 140 that couples a portion of this output on a main fiber 142 as an input energy to the CRO 130 and couples another portion of this output on a tap fiber (an example tapped portion) 144 out of the system 100. The CRO 130 receives the input pump energy from CRO 120 and produces further Raman shifting to produce an even longer mid-IR frequency output beam, for example, at wavelengths between approximately 2.5 µm to approximately 10 µm. The output energy is supplied to an output coupler 150, which has a main fiber 152 and a tap fiber 154, similar to coupler 140. As discussed further below, each of the different mid-IR output beams from taps 144 and 154 may be combined to form an overall signature mid-IR signal have a desired characteristic spectrum for use in various applications, including countermeasures. While only two CRO stages are shown, the system 100 may include numerous coupled CROs, each coupled to another by a fiber or other coupling and each capable of producing a tapped signal at a different mid-IR (or longer) wavelength.

For wavelengths above approximately 2 µm, the coupling fiber 140 and the CRO 130 may be formed of mid-IR fibers made of different mid-IR materials, such as fluoride fibers for an effective range out to ~6 µm or chalcogenide fibers for an effective range out to ~10 µm. Other example materials for forming Roman wavelength shifting fibers at longer wavelengths include tellurite ($TeO_2$) fibers.

Figure 3:
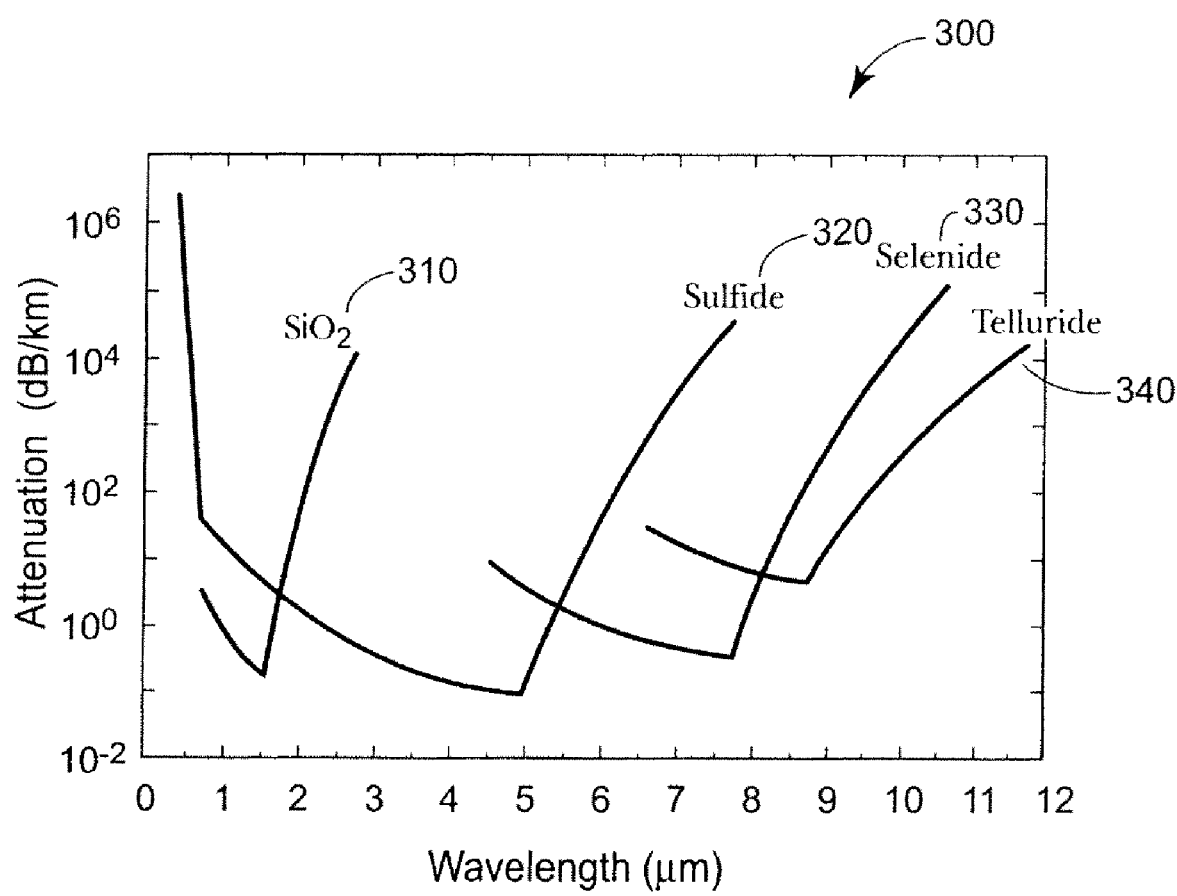
FIG. 3 illustrates a plot of attenuation versus wavelength for various mid-IR materials.

To propagate light in the mid-IR, long wavelength transmitting glasses typically need heavy atoms dopants. As an example, various mid-IR transmitting chalcogenide glasses include sulfide (S), selenide (Se) and telluride (Te). More generally, a chalcogenide glass may be composed of one or more of the chalcogen elements S, Se and Te with other elements such as germanium (Ge), arsenide (As) and antimony (Sb). It has been shown that these glasses are chemically durable, possess wide glass-forming capabilities, and can be fabricated into relatively low-loss fibers. As an example, FIG. 3 shows a plot 300 of the attenuation constant versus wavelength for fused silica 310 and three different chalcogenide fibers 320, 330, 340. As shown, the comparatively small phonon energy of chalcogenide glasses permits large transparency regions in the near, mid and far-IR. In one particular embodiment, the near-IR may fall in the wavelength range of between approximately 0.75 to approximately 2 µm, the mid-IR from approximately 2 to approximately 5 µm, and the far-IR from approximately 5 µm to approximately 20 µm. Whereas fused silica 310 has low loss out to ~2 µm, sulfide 320 has relatively low loss out to ~6 µm, selenide 330 out to ~8.5 µm, and telluride 340 out to ~11 µm.

Selenide fibers have been used for Raman amplification in the near-infrared wavelength region. In particular, an As—Se fiber has been used with a 7 µm core diameter and a numerical aperture of 0.45 at a wavelength of 1.56 µm. The peak of the Raman gain coefficient may be ~700 times larger in As—Se chalcogenide fibers compared with standard single-mode fused-silica fiber. In addition, As—Se fiber can have a much narrower Raman line (~60 $cm^{-1}$) than silica fiber (~250 $cm^{-1}$). Also, the Raman shift for As—Se fiber can be smaller (~240 $cm^{-1}$) than the Raman shift in silica fiber (~440 $cm^{-1}$). These differences reflect the resulting phonon energy due to the pump and correspond to the energy shift between the pump light and the signal light for a single Raman order. Moreover, the As—Se fiber loss can be less than 1 dB/m over a wide range from ~1.5 to ~9 µm. For most of the mid-IR range between ~2 to ~6.5 µm, the loss can be actually closer to 0.5 dB/m. However, there usually is a loss peak near ~4.5 µm, corresponding to a H—Se resonance. This absorption peak can be reduced with a modification of the glass's composition. If the selenide resonance falls at a wavelength of interest, then alternate chalcogenide fibers can be used instead, such as sulfide-based fibers. Because selenide fibers have been used for Raman amplification and because the fiber properties have been measured, the simulations presented below are based on selenide mid-IR fibers with parameter values based on the measured properties.

One alternate mid-IR fiber material is based on fluoride composition. One of the more mature fluoride fibers is the heavy metal fluoride ZBLAN ($ZrF_4$-$BaF_2$-$LaF_3$-$AlF_3$-$NaF$).

Figure 4:
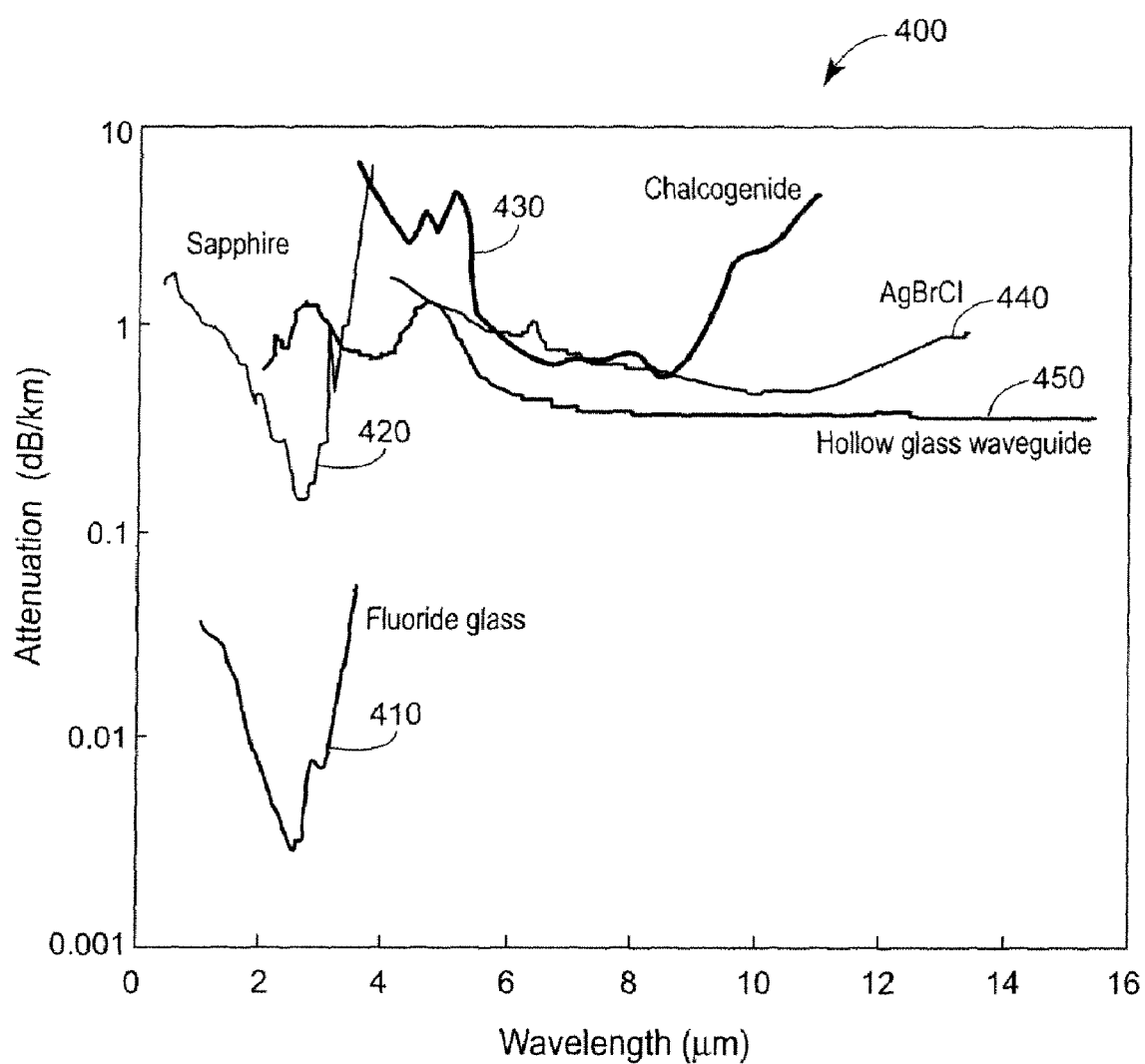
FIG. 4 illustrates a plot of attenuation versus wavelength for optical fibers made of various other glass compositions.

As shown in FIG. 4, the fluoride glass 410 has a loss coefficient more than two orders-of-magnitude lower than that of chalcogenide 430 over the wavelength range between ~2-5 µm. The Raman gain coefficient in ZBLAN is about ~2-3× larger than in fused silica fiber. Moreover, the peak of the Raman gain is ~600 $cm^{-1}$. Because the wavelength shifting is based on cascaded Raman orders, the larger wavelength shift in the fluoride fiber may mean that ~2.5 fewer steps will be needed in a fluoride fiber (410) compared to chalcogenide fiber (430) to achieve a certain wavelength shift.

In addition, for Raman wavelength shifting, the figure of merit is usually proportional to the Raman gain coefficient divided by the fiber loss. Although the actual gain coefficient can be smaller in fluoride fiber, the ratio of gain to loss may be comparable in the two (fluoride and chalcogenide) fibers, and combined with the larger wavelength shift the two mid-IR fibers can have comparable performance. However, fluoride fibers tend to be more mature technology with higher laser damage thresholds and little evidence of photo-darkening.

Other fiber types that transmit in the mid-IR could also be used, such as fibers based on tellurite glasses, sapphire 420, AgBrCl 440, or hollow glass waveguides 450.

Figure 5A:
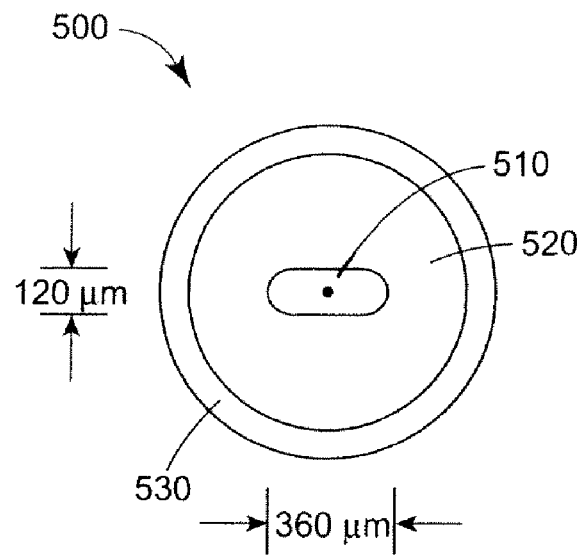
FIG. 5A illustrates an example cladding pumped optical fiber made with a dual core of an inner circular core for the signal and an outer elliptical core for the pump.

The pump laser 110 in FIG. 1 may be a cladding-pumped fiber (CPF) laser or amplifier 500 as shown in FIG. 5A. In the illustrated example, the CPF 500 has multiple cores with an inner core 510 to carry a signal wavelength and an outer core 520 to carry the pump wavelength, both surrounded by a cladding 530. FIG. 5A illustrates one particular design of the CPF laser 500, which is a double-clad fiber. Other designs of CPF also exist, such as a star-shaped cross-section for the outer core surrounding a circular inner core.

The core 510 may be formed of a silica ($SiO_2$) single-mode core doped with $Yb^{3+}$, while the outer core 520 may be formed of a lower index of refraction polymer cladding, and the layer 530 a protective polymer.

Figure 5B:
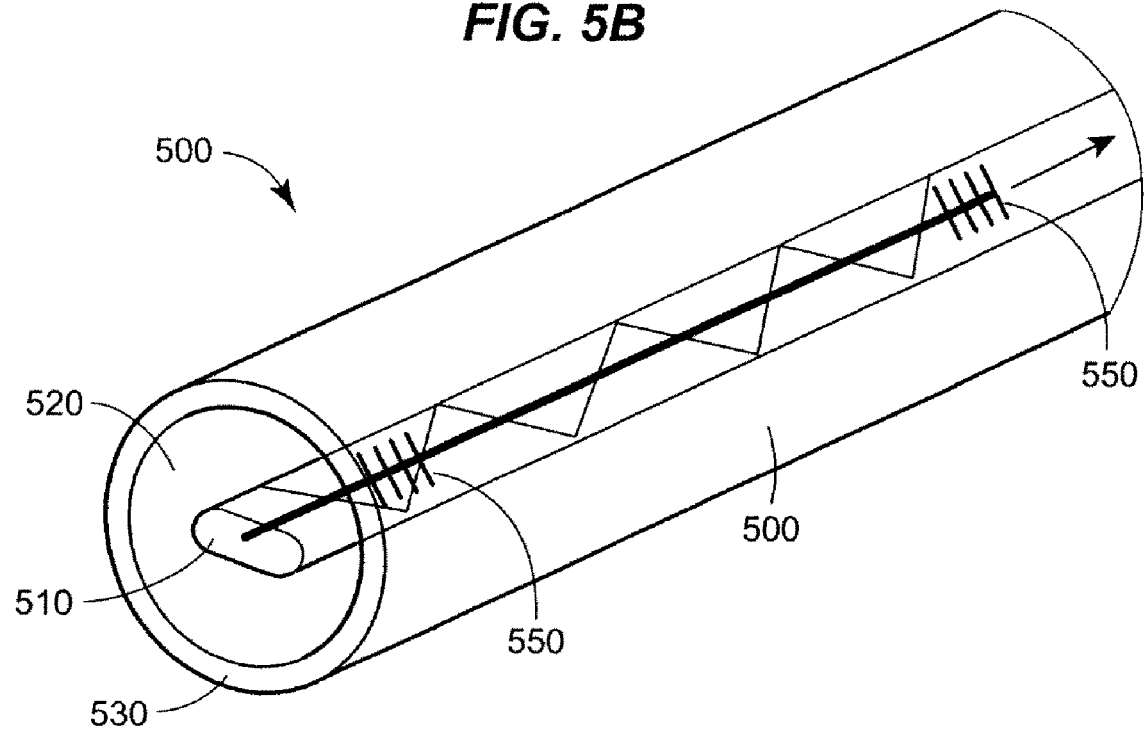
FIG. 5B illustrates the example of FIG. 5A and showing gratings placed at opposing ends of the cladding pumped optical fiber.

If the CPF 500 is an amplifier it would have a seed input that the CPF 500 boosts in power. As a laser, on the other hand, the CPF 500 may have two reflectors formed in the inner core, with at least one of the reflectors being partially transmitting. In the illustrated example, these reflectors are gratings 550 formed directly into the CPF 500, as shown in FIG. 5B. In other examples the reflectors may be external to the CPF 500.

Figure 6:
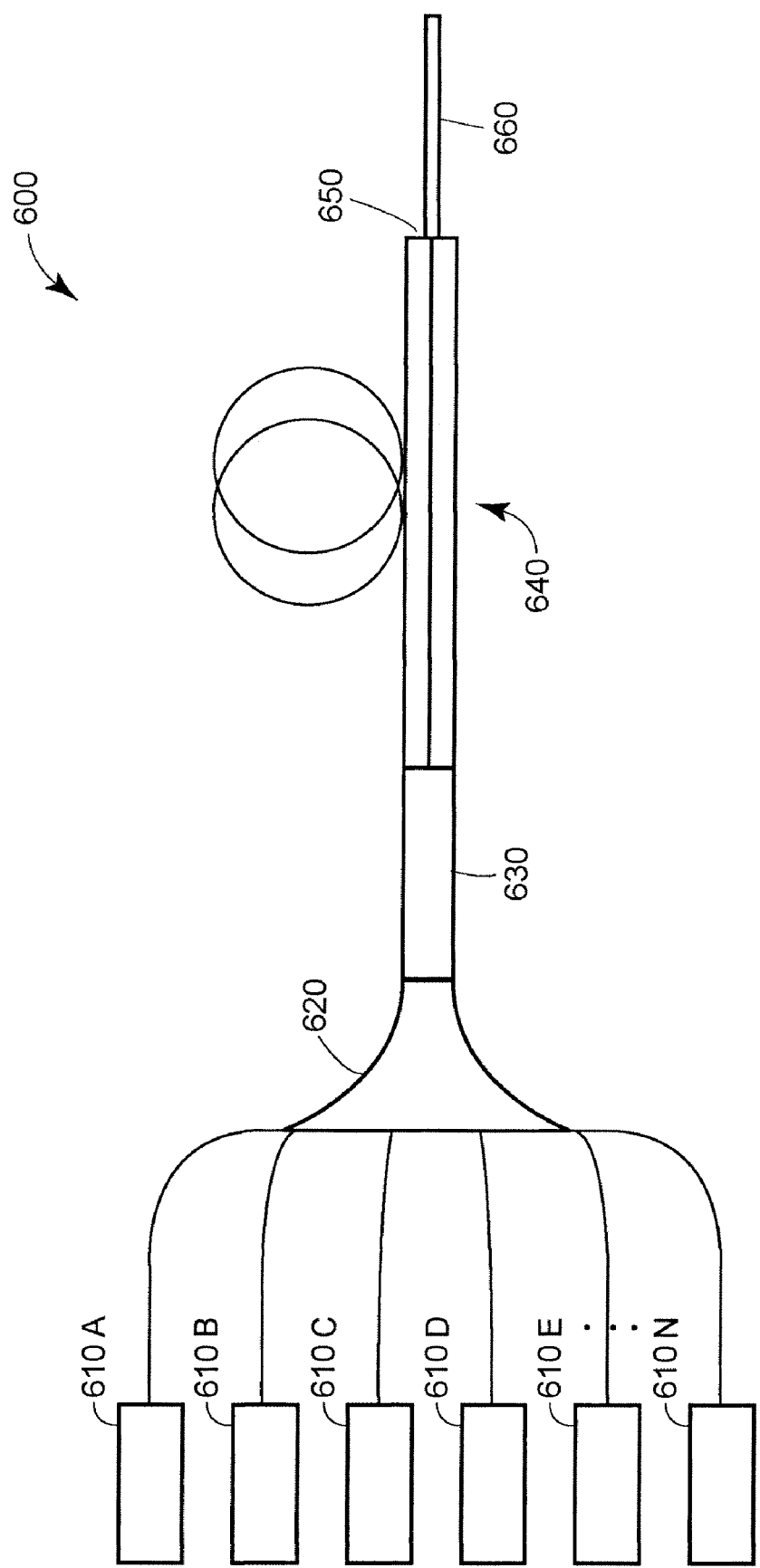
FIG. 6 illustrates an example cladding pumped fiber (CPF) pumped by a plurality of laser diodes coupled through a multi-mode coupler to the cladding pumped fiber.

FIG. 6 shows another pump laser source 600 having one or more laser diodes 610 (610A-610N) producing pump signals combined using a fiber coupler 620, which may be formed of multi-mode fiber. In general, one side of the laser source 600 may include a multiplexer and mode converter, while the other side may be coupled to a single spatial mode fiber. A mode matching taper region 630 is used to impedance match between the coupler 620 and a CPF 640. In this example, the laser diode pumps 610 are multi-mode sources operating at around 915 nm; and the CPF 640 is a $Yb^{3+}$-doped double-clad fiber. Although a forward pump scheme is illustrated, the CPF 640 can be forward or reverse pumped, particularly when used as an amplifier. The CPF 640 may be coupled at a coupling region 650 to a single-mode fiber 660, for example, with an outer cladding diameter of 125 µm.

Although one example of the pump laser is a cladding pumped fiber laser, other pump lasers may be used instead. For example, the pump laser may include a solid state laser, semiconductor laser diodes, single spatial mode rare-earth doped fiber amplifiers, as well as optical parametric amplifiers or oscillators.

Figure 7:
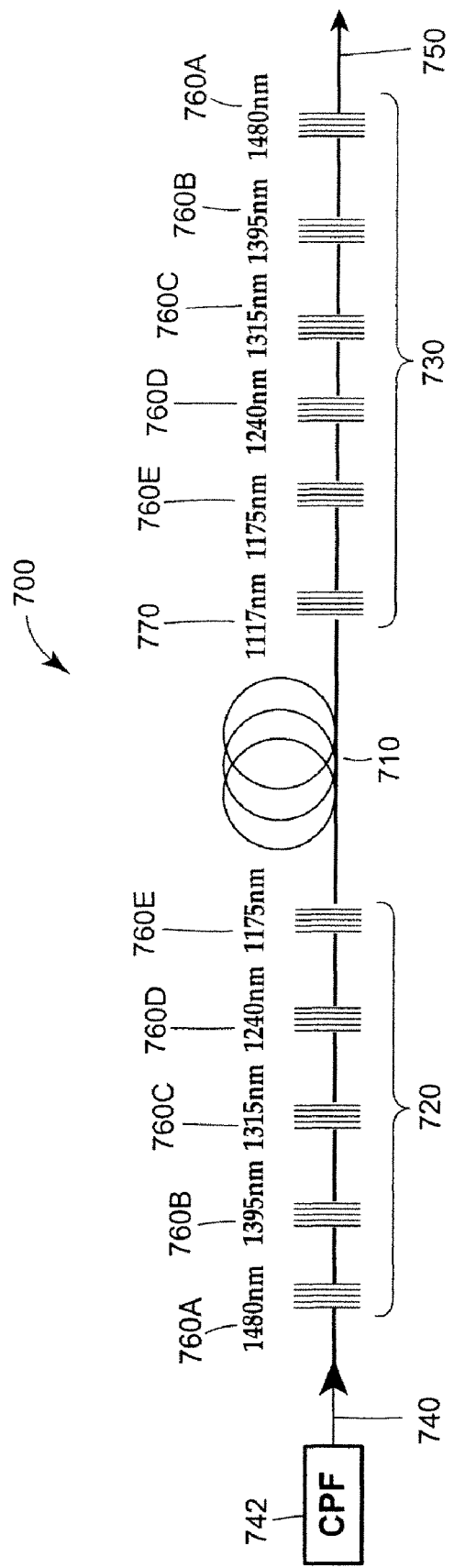
FIG. 7 illustrates an example of a cascaded Raman oscillator, where a length of a germanosilicate fiber is bounded by pairs of fiber Bragg gratings.

FIG. 7 illustrates an example CRO 700 that may be used as one of the Raman oscillators or Raman wavelength shifters 120, 130 of FIG. 1, preferably the first CRO 120. In this embodiment, the CRO 700 uses a germanosilicate fiber 710 surrounded by one or more pairs of grating reflectors 720, 730. In this particular example, a pump signal 740 (e.g., approximately 1117 nm) from a ytterbium-doped CPF 742 is wavelength shifted up to approximately 1480 nm at an output signal 750 by cascading through five orders or Raman shifts in the CRO 700.

The grating reflectors 720 and 730 are shown has having multiple gratings that depending on the position will reflect various Raman shifted frequencies produced during the overall Raman shifting process. Grating pairs 760A for example correspond to the output wavelength 1480 nm, which is the final Raman shifted step for the CRO 700. The grating pairs 760E reflect 1175 nm within the system 700, which corresponds to the first Raman shifted step producing photons that are to be further shifted by the CRO 700. A grating 770 is also shown and serves as a pump reflector for the CPF 742 so as to prevent unconverted pump energy at the 1117 nm wavelength from exiting the as part of signal 750.

Figure 8:
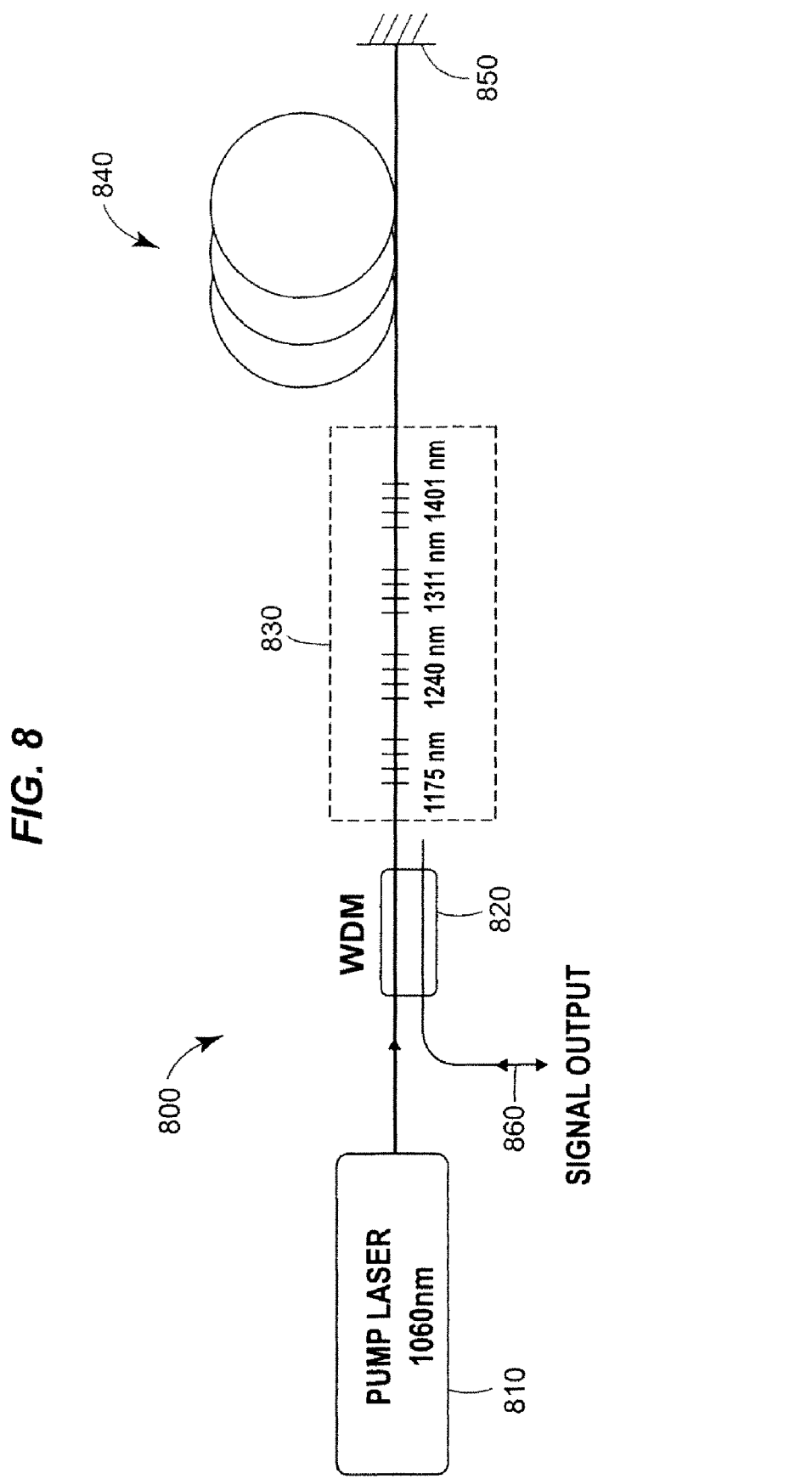
FIG. 8 illustrates another example of a cascaded Raman oscillator, where a length of Raman gain fiber is surrounded on one side by a broadband reflector and on the other by a plurality of Bragg gratings.

FIG. 8 illustrates another example CRO 800 that may be used in the configuration of FIG. 1. The CRO 800 has a wavelength division multiplexer (WDM) pump source 810, a Raman gain fiber 840, a filter grating 830, and a broadband reflector 850 (e.g., a mirror). By using the broadband reflector 850, the number of gratings 830 required compared to FIG. 7 can be reduced in half. However, the input and output are from the same side, so a wavelength division multiplexer 820 is needed to separate out the wavelength shifted output 860 from the pump signal from laser 810. The output signal 860 would then be supplied to a fiber coupler such as those described in FIG. 1, for coupling the majority of the output signal 860 to a subsequent CRO stage and a portion of the signal 860 out of the system.

Although two examples of CRO's are given in FIGS. 7 and 8, many other configurations may be used for wavelength shifting using the cascaded Raman process herein. Another example is to use an open loop or length of fiber, which can perform effective Raman wavelength shifting when the pump laser is pulsed. Still, other configurations of CROs can be implemented using bulk mirrors and gratings or prisms. Furthermore, by using temperature tuning of the gratings or multiple output gratings at different wavelengths in the configurations of FIG. 7 or 8, the pump laser can be made tunable or provide multiple wavelength outputs.

Figure 9:
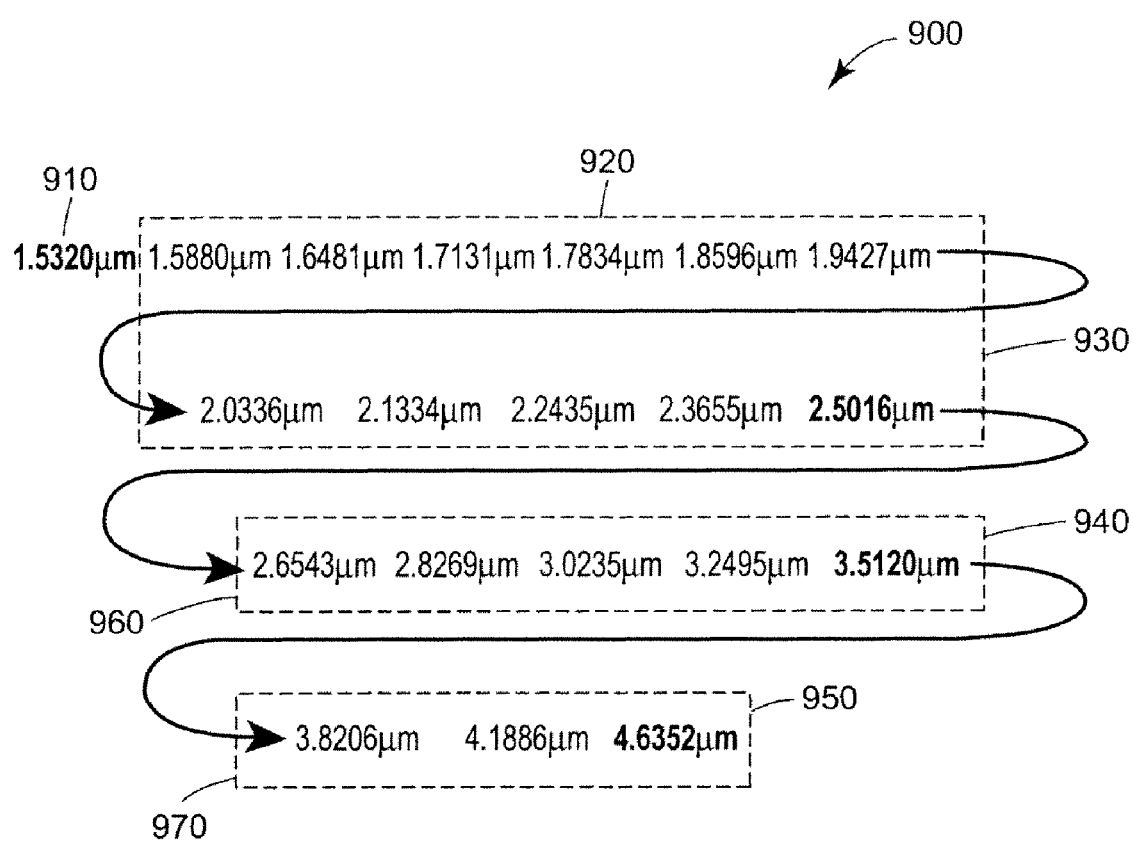
FIG. 9 illustrates an example wavelength shifting scheme, starting with a pump wavelength near 1.532 µm and shifting to approximately 2.5, 3.5 and 4.5 µm.

FIG. 9 shows the cascaded Raman orders 920 for shifting from a seed wavelength 910 at 1.532 μm to a wavelength 930 at ~2.5 μm to a wavelength 940 at ~3.5 μm, and finally to a wavelength 950 at ~4.6 μm, all using As—Se chalcogenide fibers. In the illustrated example, eleven (11) Raman orders 920 are used to shift from the seed wavelength to the wavelength 930 (~2.5 μm), another five (5) Raman orders 960 to shift further to the wavelength (~3.5 μm), and three (3) more Raman orders 970 to shift out to the wavelength (~4.6 μm). Each order corresponds to a discrete phonon energy (e.g., 240 cm$^{-1}$), so that fewer energy steps are usually required as the photon energy becomes smaller at the longer wavelengths. Therefore, shifting to wavelengths longer than ~5 μm can become easier because fewer Raman cascaded orders are required.

To simulate the efficiency of the cascaded Raman process, a set of coupled mode equations can be solved numerically. For example, the governing equations can be the coupled wave equations, $$\frac{dP_p}{dz} = -\frac{v_p}{v_s}gP_pP_{s1} - \alpha_pP_p,$$

$$\frac{dP_{s1}}{dz} = gP_pP_{s1} - \frac{v_{s1}}{v_{s2}}gP_{s1}P_{s2} - \alpha_{s1}P_{s1}\dots$$

$$\frac{dP_{sN}}{dz} = gP_{sN-1}P_{sN} - \alpha_{sN}P_{sN}$$

where each equation corresponds to a particular Raman order. The terms on the left hand side are the propagation evolution; and the first equation corresponds to the pump (e.g., the amplified seed wavelength); and the last equation corresponds to the final Raman order. For the intermediate orders, there are three terms on the right hand side of the equation: the first ($gP_pP_{s1}$) corresponding to gain from the previous order, the second ($V_{s1}/V_{s2}gP_{s1}P_{s2}$) corresponding to loss to the next order, and the third ($\alpha_{s1}P_{s1}$) to the attenuation due to the fiber loss.

An initial value problem can be solved where the pump at the first wavelength is given, and a spontaneous background power level corresponding to one photon per mode over a bandwidth of ~10 cm$^{-1}$ is assumed at all of the Raman cascade order wavelengths. Parameters for the selenide fibers were used in the simulations. Because the lengths for the mid-IR fibers are a few meters or less, it may be assumed that the polarization mode scrambling is negligible and that the pump and signal wavelengths are co-polarized. The coupled equations can be solved by standard numerical integration techniques, such as the Runge-Kutta method. In these initial simulations, only the gain coefficient at the peak of the Raman gain curve is included.

Figure 10:
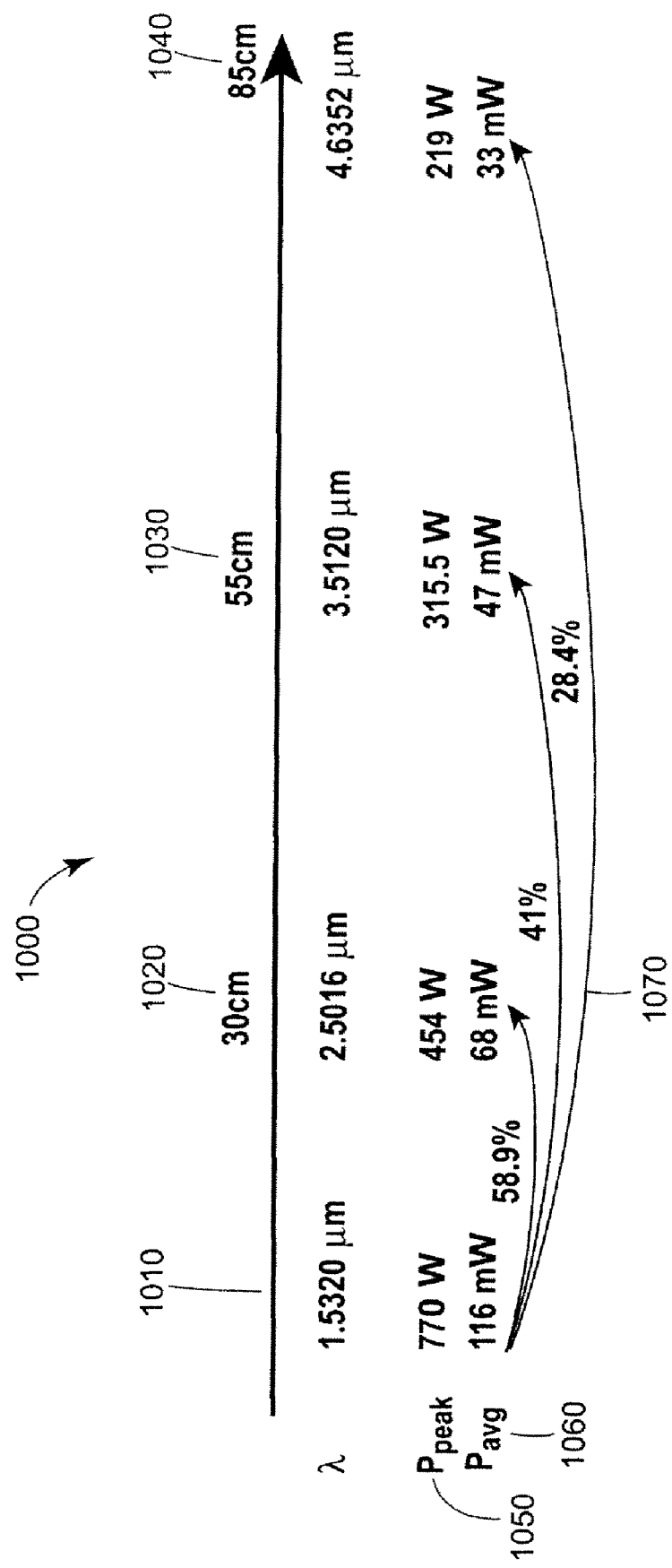
FIG. 10 illustrates an example set of simulation results for pulsed pumping of 1.532 µm and corresponding wavelength shifting in different lengths of open loop chalcogenide fiber under a Raman wavelength shifting process.

FIG. 10 illustrates a plot 1000 of the efficiency values 1070 and power levels 1050 (peak) and 1060 (average) for shifting a pulsed pump laser signal 1010, a telecommunication wavelength of 1.532 μm. The pump signal is converted to an output wavelength 1020 (2.5 μm), to wavelength 1030 (3.5 μm) and to wavelength 1040 (4.6 μm) in a 7 μm core diameter single-mode fiber. This example corresponds to the wavelengths of FIG. 9, and since the pump is pulsed, an open loop configuration can be used for this Raman scattering process. The particular wavelengths, pulse width and repetition rate are chosen as an example, as the cascade Raman wavelength shifting can operate over a wide range of parameters. As the numbers illustrate, the cascaded Raman shifting can be very efficient, and the design configuration can be relatively simple.

Figure 11A:
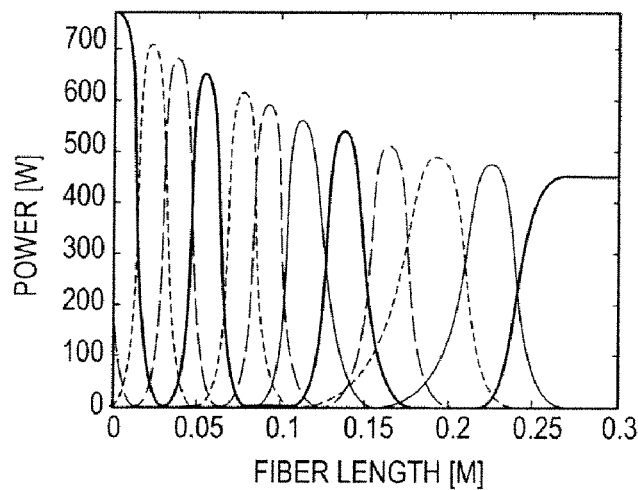
FIGS. 11A-11C illustrate plots of the transfer of energy as a function of fiber length for the example of FIG. 10, where
Figure 11B:
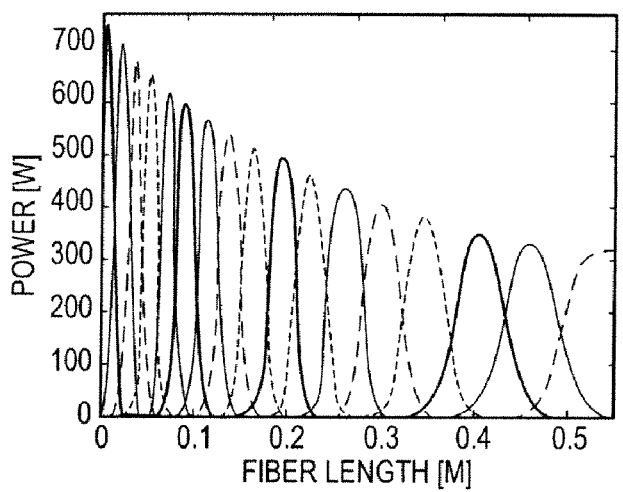
Figure 11C:
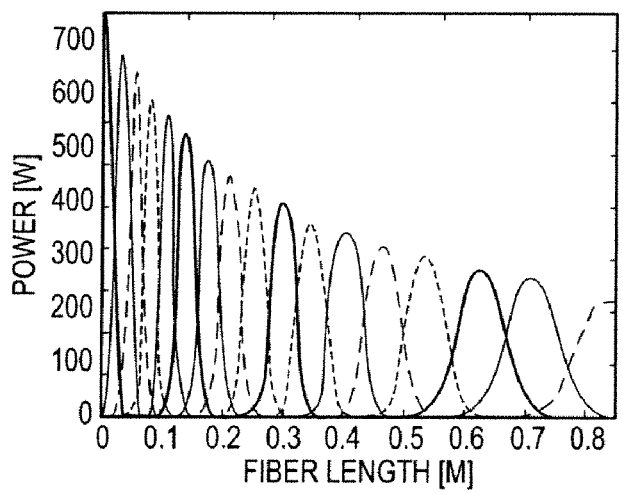

The pump power into the mid-IR fiber is assumed to be 2 GW/cm$^2$, which is approximately the experimentally measured damage threshold in the selenide fibers for pulsed operation. For the test, 15 ns pulses and a 10 KHz repetition rate were assumed, which corresponds to a peak power of $P_{peak}$=770 W and an average power of $P_{avg}$=116 mW at the beginning of the chalcogenide fiber. The results are shown in FIGS. 11A-11C. In a 30 cm length of fiber, the pump shifted out to 2.5016 μm (FIG. 11A) with a 58.9% efficiency (output of $P_{peak}$=454 W and $P_{avg}$=68 mW). In a 55 cm length of fiber, the pump shifted out to 3.512 μm (FIG. 11B) with a 41% efficiency (output of $P_{peak}$=315.5 W and $P_{avg}$=47 mW). Finally, in an 85 cm length of fiber, the pump shifted out to 4.6352 μm (FIG. 11C) with a 28.4% efficiency (output of $P_{peak}$=219 W and $P_{avg}$=33 mW).

The efficiency of the cascaded Raman wavelength shifting can be close to the quantum efficiency (i.e., the ratio of the photon energies), less any propagation loss in the fiber, which is not so large for the short lengths involved. Note that the efficiency for the longest wavelength can be degraded by the absorption peak near 4.5 μm. In addition, as FIGS. 11A-C indicate, the photon energy rolls down to longer wavelengths as the light propagates down the fiber, and in principle can approximately fully deplete the energy from the previous order and then pump the next order.

For many applications such as chemical sensing and spectral fingerprinting, the tunability of the mid-IR laser can be a valuable attribute. In one embodiment, the mid-JR laser can be tuned by tuning the wavelength of the pump laser. For example, if the pump laser is a laser diode centered around 1.5 μm, then the mid-IR source can be made tunable by replacing the laser diode with a tunable laser diode. It should be noted that the tuning range is proportional to the change in photon energy. Therefore, a small or moderate wavelength tuning at ~1.5 μm can lead to a large Δλ in the mid-IR wavelength range. For example, tunable laser diodes are commercially available that tune over a band—i.e., a C-band or conventional band tunable laser diode will tune over 1.53 μm to 1.57 μm. As shown in the table below, this 40 nm energy tuning at the seed signal wavelength can lead to a ~100 nm tuning around 2.5 μm, a ~220 nm tuning around 3.5 μm, and a ~400 nm tuning around 4.6 μm. Consequently, it may only be necessary to temperature or current tune the seed signal laser (i.e., about 5 nm) to obtain a significant tuning in the mid-IR wavelengths.

| Tunable LD I [μm] | ~2.5 μm (11 orders) | ~3.5 μm (16 orders) | ~4.6 μm (19 orders) |
| --- | --- | --- | --- |
| 1.53 | 2.5 | 3.5 | 4.6 |
| 1.57 | 2.6 | 3.72 | 5.0 |
| Conversion efficiency | 58.9% | 41% | 28.4% |

Another desired attribute of the mid-IR fiber laser may be to increase the time-averaged power from the laser. To scale the average power to higher levels, larger core sizes for the fibers can be used (i.e., the intensity would be fixed at the damage threshold, but the power is the area of the fiber times that intensity). As an example, the cascaded Raman wavelength shifting has been simulated starting from a 1.532 μm pump out to 2.2 μm (2 W output), 3.4 μm (1 W output) and 5 μm (4 W output) μm with 10 ns pulses at 100 kHz repetition rate. Staying within the 2 GW/cm² damage intensity, the pump power and fiber parameters are provided in the table below. It should be noted that although the larger core size of these fibers means that they are multi-mode fibers, the meter or so lengths involved single spatial mode (i.e., M²<1.4) can be maintained by launching the light properly, avoiding twists and mode scrambling in the fiber, and perhaps using some mode-stripping at the end. Furthermore, the line widths at these output wavelengths should be 2-5 nm or wider. Example configuration numbers are provided in the table below.

| Output wavelength | Output average power | Conversion efficiency | Pump wavelength | Pump average power | Fiber length | Fiber core diameter |
| --- | --- | --- | --- | --- | --- | --- |
| 2.24 μm | 2 W | 65.8% | 1.532 μm | 3.03 W | 24 cm | 13.9 μm |
| 3.40 μm | 1 W | 41.4% | 1.517 μm | 2.41 W | 62.5 cm | 12.4 μm |
| 5.00 μm | 4 W | 21.8% | 1.532 μm | 18.34 W | 150 cm | 34 μm |

Figure 12:
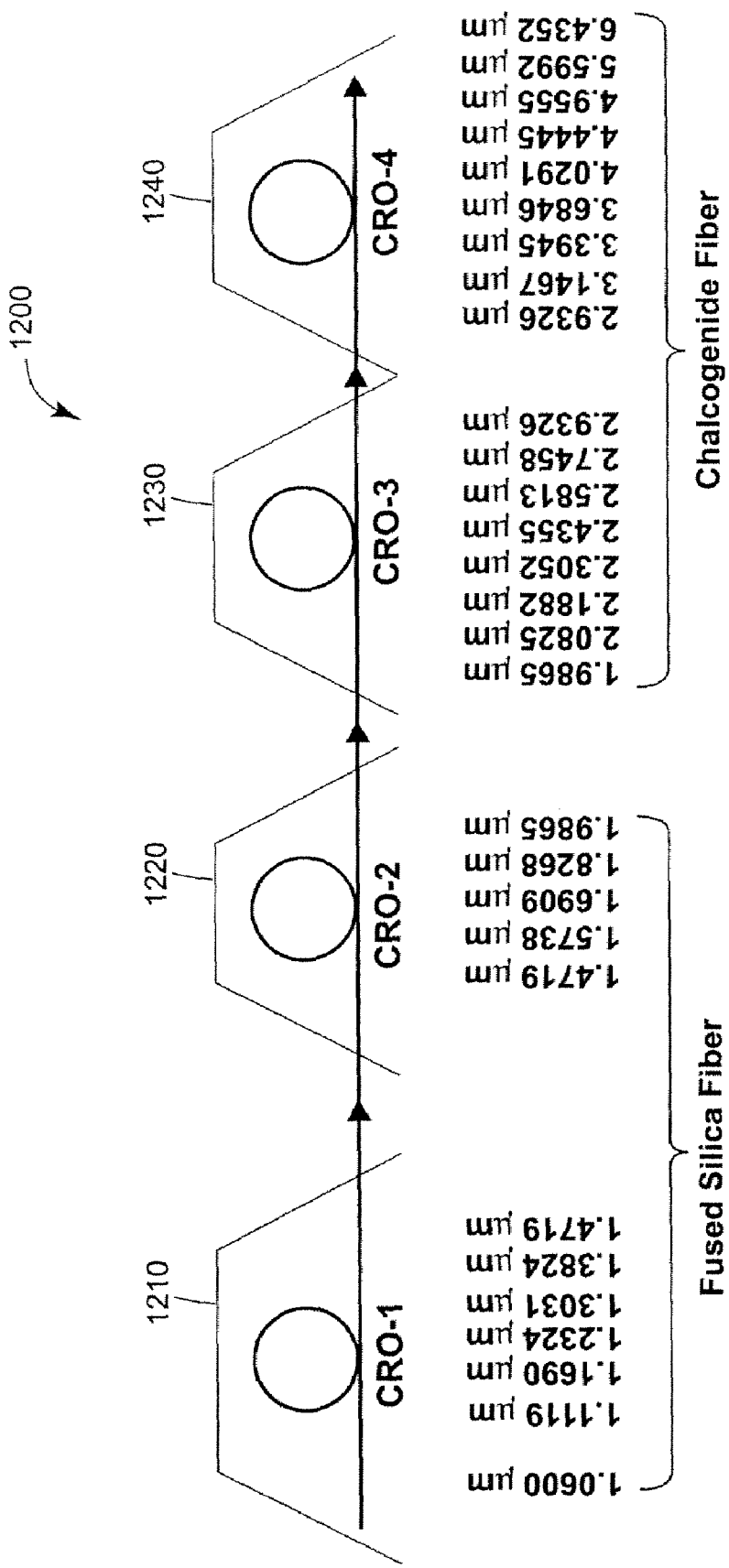
FIG. 12 illustrates a cascaded Raman wavelength shifting process using a continuous wave pump source and multiple stages of cascaded Raman oscillators.

Another advantage of the cascaded Raman wavelength shifter approach is that the pulse repetition rate can be varied from cw to 100 kHz or more. When using a cw pump, however, the peak power is low, so resonators must be used to multi-pass the signal to increase the efficiency. As another example of multiple order cascaded Raman wavelength shifting, FIG. 12 shows an alternate configuration 1200 where a pump wavelength (1.0600 nm) is shifted out to 2 μm using fused silica fiber CROs 1210, 1220, and then the wavelength shifting is carried out to 6.5 μm in chalcogenide fiber CROs 1230, 1240. The motivation for this hybrid fiber configuration is to stay in fused silica fiber as long as possible, since it can be a well-established technology where gratings can be integrated, and the entire assembly can be fusion spliced. Then, when the loss in fused silica fiber grows beyond approximately 1 dB/m, the wavelength shifting can be transferred to the chalcogenide fibers. Moreover, it may be advantageous to shift approximately five orders in a single CRO, but then to shift to another stage for the additional shifting. By limiting the number of splices and gratings, the loss as one moves to longer and longer wavelengths can be minimized by using the multiple CRO configuration 1200. Although not shown, it will be appreciated that a coupler with a corresponding tap may be positioned between each of the CRS 1210, 1220, 1230, and 1240, for producing four different mid-IF wavelength signals that may be combined to form an overall mid-IR signal.

Figure 13:
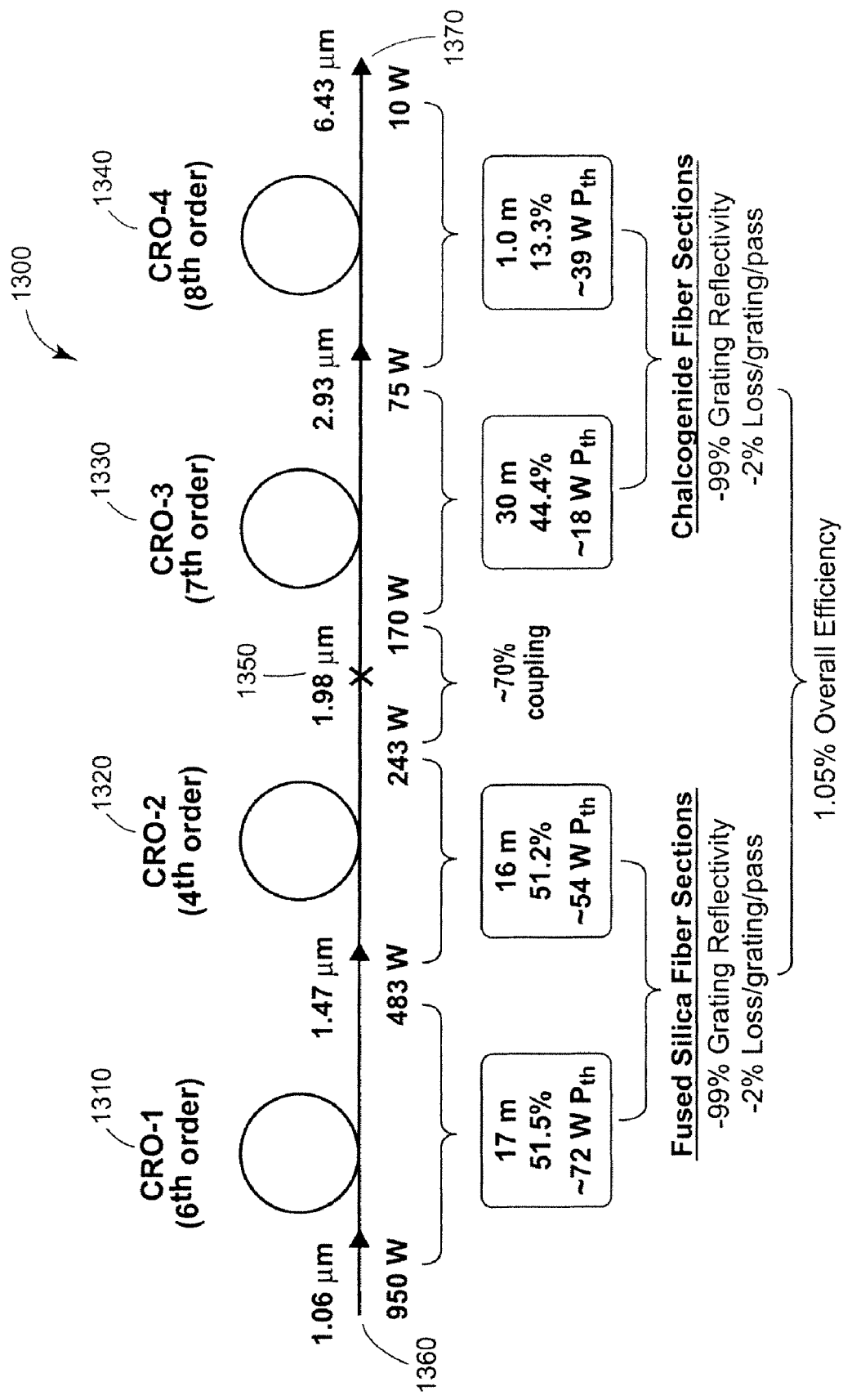
FIG. 13 illustrates simulation results for a cascaded Raman wavelength shifting process using multiple stages of cascaded Raman oscillators.

In this particular example, a summary of the calculated values for the configuration illustrated in FIG. 12 is shown in FIG. 13. For the configuration 1300, a 99% grating reflectivity is assumed for each grating, and an approximately 2% loss per grating pass is assumed. In addition, a ~70% coupling efficiency section 1350 is assumed between fused silica CROs 1310, 1320 and the chalcogenide CROS 1330, 1340. Under these assumptions, the overall efficiency from 1.06 μm to 6.43 μm is ~1.05%. Starting from an input of 950 W for a pump beam 1360, the output beam 1370 at 6.43 μm is calculated to be approximately 10 W. The fiber lengths of each individual CRO are shown and with their individual conversion efficiencies and the approximate power threshold values $P_{th}$ (e.g., power level at which the oscillator begins to lase.) As shown, each CRO stage will not only produce a different mid-IR wavelength, but each may be formed of fibers of different lengths, each may shift by a different number of Raman orders, and each may have a different conversion efficiency for converting the respective input beam to the respective output beam.

Figure 14:
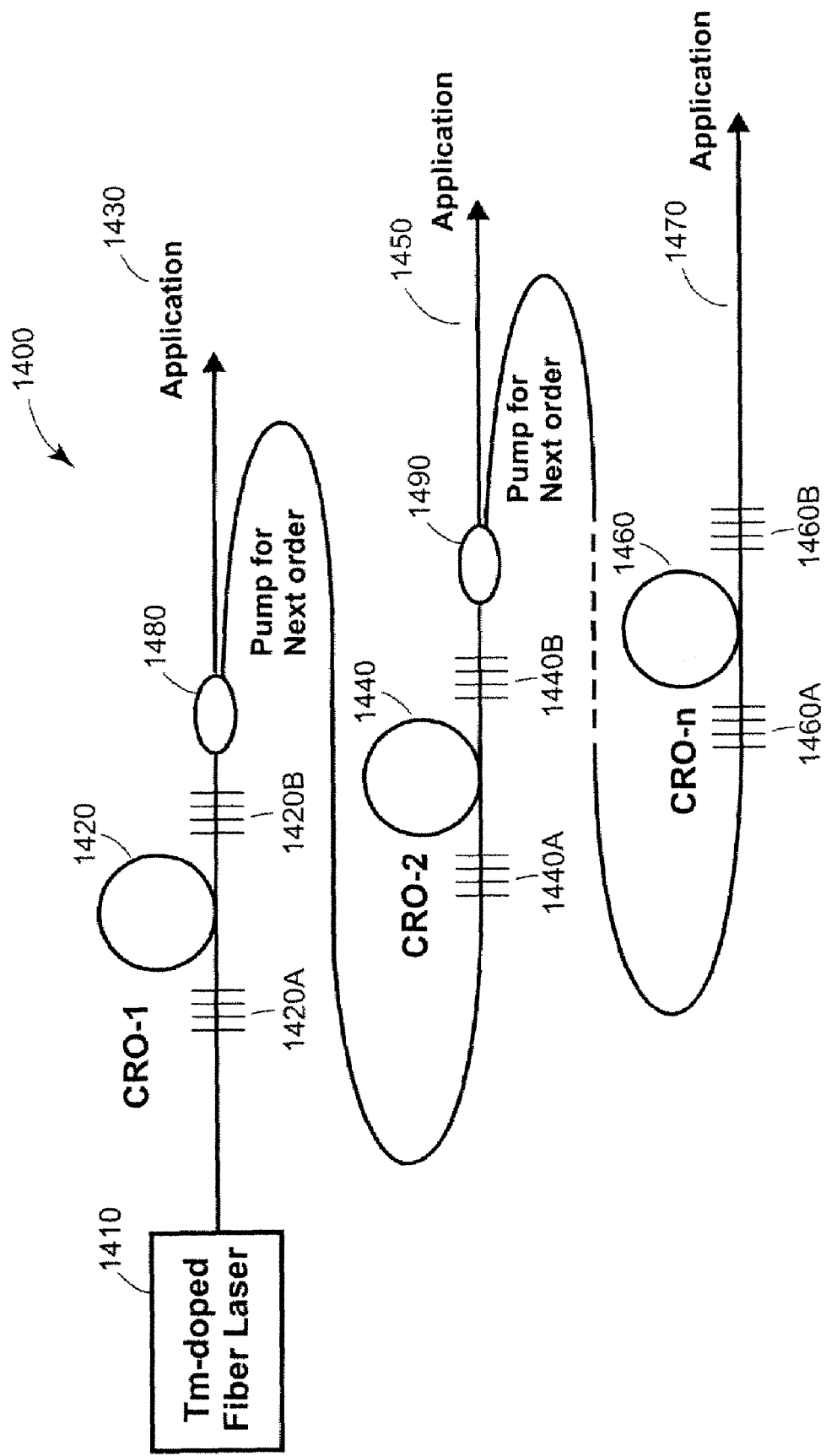
FIG. 14 illustrates another example of cascaded Raman oscillators pumped by a continuous wave source light and using a thulium-doped fiber laser.

FIGS. 9-13 illustrate example calculations, Raman orders and pulsed or cw pumping configurations. However, other combinations of wavelengths, CROs, fiber lengths, and fiber types can be used within the scope of the disclosure. As another example, FIG. 14 illustrates a configuration for a cw system 1400, where a pump source 1410 may be a solid-state laser or a cladding pumped fiber laser with a pump wavelength of 1.94 μm, such as originating from a thulium-doped fiber laser. In this particular example, CROs 1420, 1440, and 1460 are formed of chalcogenide fibers, each surrounded by corresponding grating reflectors 1420A-B, 1440A-B, and 1460A-B, respectively. Only three CROs are shown, but the last one represents the nth CRO in the system 1400.

The pump laser 1410 is coupled to the three stages of CROs, which are used to wavelength shift out to respective output values of ~2.5 µm (1430), ~3.5 µm (1450) and ~4.6 µm (1470). The output signals 1430 and 1450 are partially coupled as an input signal to a subsequent CRO stage and partially tapped to produce an output signal at different mid-IR wavelengths. Couplers 1480 and 1490 are shown, where the final CRO 1460 stage has no coupler.

Figure 15:
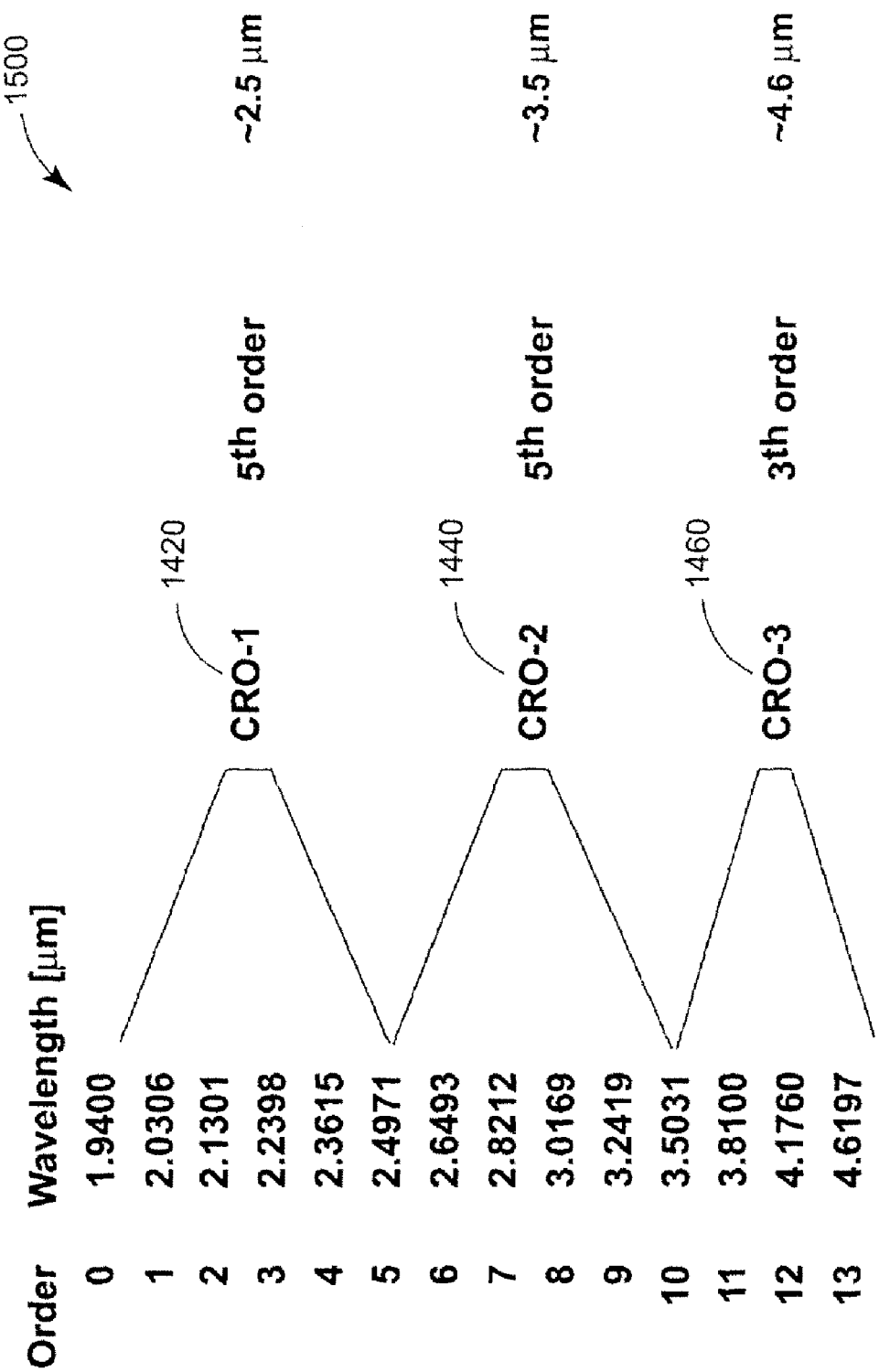
FIG. 15 is an illustration of the wavelengths in a series of cascaded Raman oscillators, starting from a pump wavelength of 1.94 µm and shifting to approximately 2.5, 3.5 and 4.5 µm.
Figure 16:
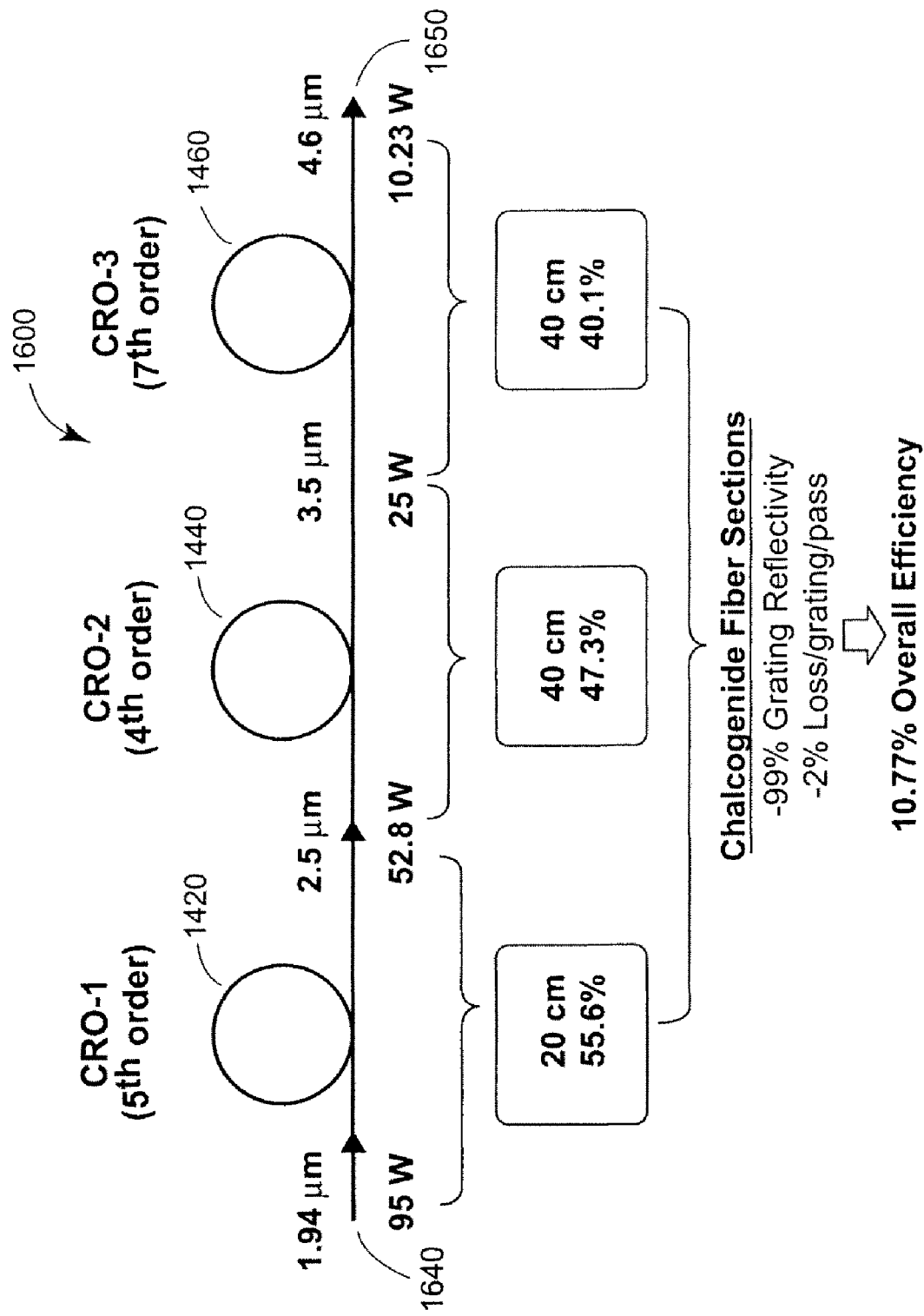
FIG. 16 is an illustration of simulation results for cascaded Raman shifting in three stages of cascaded Raman oscillators implemented in chalcogenide fibers surrounded by reflectors or gratings.

For an n=3 application of the configuration 1400, the intermediate Raman orders 1500 are illustrated in FIG. 15; and the efficiencies and configuration 1600 are illustrated in FIG. 16 (without showing the couplers) and listed in the Table below. The simulations include the loss of the fiber and assume 99% reflectivity of the gratings and a 2% loss per grating per pass. Since the gratings include loss, the number of Raman cascade orders in a particular oscillator are advantageously limited to 5 or 6. Consequently, starting from a pump beam 1640 at the wavelength 1.94 µm, the first CRO-1 1420 shifts the light to ~2.5 µm, and the output is used to pump the CRO-2 1440 to shift the light to ~3.5 µm, and finally the output is used to pump the CRO-3 1460 to shift the light out to an output wavelength 1650 of ~4.6 µm. Also, if the pump wavelength were 1.06 µm instead, then a fused-silica based cascaded Raman oscillator could be used to shift the pump from 1.06 µm to roughly 2 µm with ~25% efficiency, with subsequent stages formed of chalcogenide. The lengths for each CRO fiber loop and open loop input and output fiber sections is illustrated (20 cm, 40 cm, and 40 cm), along with the internal conversion efficiencies of each, where the percent efficiencies refer to the output power divided by the input power at the pump wavelength.

| Output Wavelength | Oscillator Parameters | Pump Power (for 10 W output) | Efficiency (at 10 W output) |
|---|---|---|---|
| 2.5 µm | CRO1 (20 cm) | 27.1 W | 36.9% |
| 3.5 µm | CRO1 + CRO2 (40 cm) | 52 W | 19.23% |
| 4.6 µm | CRO1 + CRO2 + CRO3 (40 cm) | 95 W | 10.77% |

In summary, a simple, highly efficient, power scalable mid-IR laser can be implemented in fibers that can have a range of pulse repetition rates and is based on cascaded Raman wavelength shifting in optical fibers. Exemplary fiber types include fused silica fiber, chalcogenide fibers, fluoride fibers, tellurite fibers, or some combination of these fibers. The power limitation can arise from the damage threshold in these fibers, and average powers of several watts can be achieved by increasing the fiber core size. Also, the higher power mid-IR lasers can be pumped using either solid state lasers or cladding-pumped fiber lasers. Moreover, the pulse repetition rate can be varied from cw to 100 KHz or higher. Whereas pulsed pumping can use an open loop fiber for wavelength shifting, in cw pumping the efficiency can be increased by using oscillators. Particular configurations are shown by way of example, but many other embodiments can be used within the scope of the disclosure. For example, a cascade of CROs can be used, with light taped off after each CRO so as to create a multiple wavelength output. In addition, other waveguides can be used instead of fibers, such as semiconductor waveguides, glass waveguides, doped substrate waveguides, hollow core fibers, or photonic crystal fibers.

Example Applications for a Mid-Infrared Fiber Laser

The mid-IR laser may be particularly beneficial in a number of applications, including semiconductor process control, combustion monitoring, military infrared countermeasures (IRCM) and chemical sensing, and biomedical ablation and imaging. The fiber based mid-IR laser benefits these numerous applications because it can be compact, lightweight, robust, with no moving parts and potentially inexpensive. In addition, the mid-IR laser may be made mostly of commercial off-the-shelf parts, and the fiber integration can mean that no optical bench is required. In the following, some of the applications of the mid-IR laser will be described. There are, of course, many other applications for the mid-IR laser consistent with the scope of the disclosure.

One example of the application of the mid-IR laser is to the semiconductor processing industry, where an important criterion for commercial success is yield. One of the significant contributors to the yield of a processing plant is the etch process, particularly the etching of gates and the etching of holes for contacts (so-called dielectric etching). The mid-IR fiber-based light source can potentially measure in-situ the chemicals in a semiconductor processing chamber as an input to the advanced process control (APC) engine. By monitoring the chamber conditions, advanced process control has the potential to increase the yield and repeatability of the process.

Currently, most commercial semiconductor processing machines operate open loop. For example, the APC treats the semiconductor growth chamber as a black box. The input and output are correlated, and then the output can be measured to guide the APC engine. However, the yield could be improved by having feedback from the chamber that can be used as an input to the APC engine. Two problems have plagued obtaining an appropriate feedback signal: (a) relatively low concentration of molecules in the chamber; and (b) the complexity of the "soup" in the chamber, and clearly identifying species that are signatures of the process state. Many of the previous studies have been hampered by complicated and time consuming signal processing to improve the signal-to-noise ratio. Another alternative is to look at the exhaust hose of the chamber, where there is a relatively high concentration of gas. However, this is done primarily for environmental reasons, and it is usually too far downstream in the processing to benefit APC. The mid-IR laser could potentially enable in-situ process control by providing a feedback signal that can guide the APC engine.

Optical absorption spectroscopy can be used to monitor the etch process in a semiconductor chamber. For example, the poly gate etching can be monitored by measuring the composition of HCl and HBr. Moreover, the contact hole etching or dielectric etching can be characterized by monitoring the species of $C_xF_y$ in the vacuum chamber. Most of these compounds and molecules have their molecular or vibrational absorption in the mid-infrared region (e.g., 1.7 to 6.5 µm). The mid-IR fiber laser could be a tunable, bright light source to operate over this wavelength range and that can be compatible with use on a semiconductor vacuum chamber.

A compact, lightweight, rugged, tunable, mid-IR laser with 10's to 100's milli-watts of power can be beneficial for optical absorption spectroscopy. Some of the advantages of the fiber-based mid-IR source over other methods of generating mid-IR light include: (a) maturity of underlying technology; (b) simple tuning over wide wavelength range; (c) excellent beam quality with $M^2<1.4$; (d) qualities of fiber-based sources, such as being robust, compact, lightweight and easy to use; (e) room temperature operation over a flexible repetition rate; (f) wide wavelength range from 1-6.5 μm or longer; and (g) simple system with efficiency close to the quantum limit.

For many etch processes, the detailed chemical mechanisms of the process are often not well characterized. As an example, etching of $SiO_2$ contact holes (vias) often suffers from a problem known as etch-stop (the etch process prematurely stops before etching through the desired amount of $SiO_2$). This problem is related to unusually high rates of polymer formation during the etch reaction (some polymer formation is normal and desirable for control of the sidewall shape), but the sparse amount of real-time data on chemical species in the chamber during both normal operation and during etch-stop conditions has limited the detailed scientific study of this problem. The proposed monitoring system based on the fiber mid-IR laser would greatly aid in studying this problem meaning that new scientific studies could be enabled based on real-time monitoring of chemical compositions in the chamber.

Thus, the basic idea of using the mid-IR source is to measure in-situ with high SNR the chemicals in the chamber and to feed this data back to the advance process control engine. However, for such a tool to be commercially viable in the process plant, a number of criteria for the light source would likely need to be satisfied, including: (a) reliability; (b) simple to operate and maintain; (c) room temperature operation; (d) compact; and (e) no modification to the machine and no contaminants. Fortunately, the fiber-based mid-IR light source can potentially meet these criteria.

Figure 17:
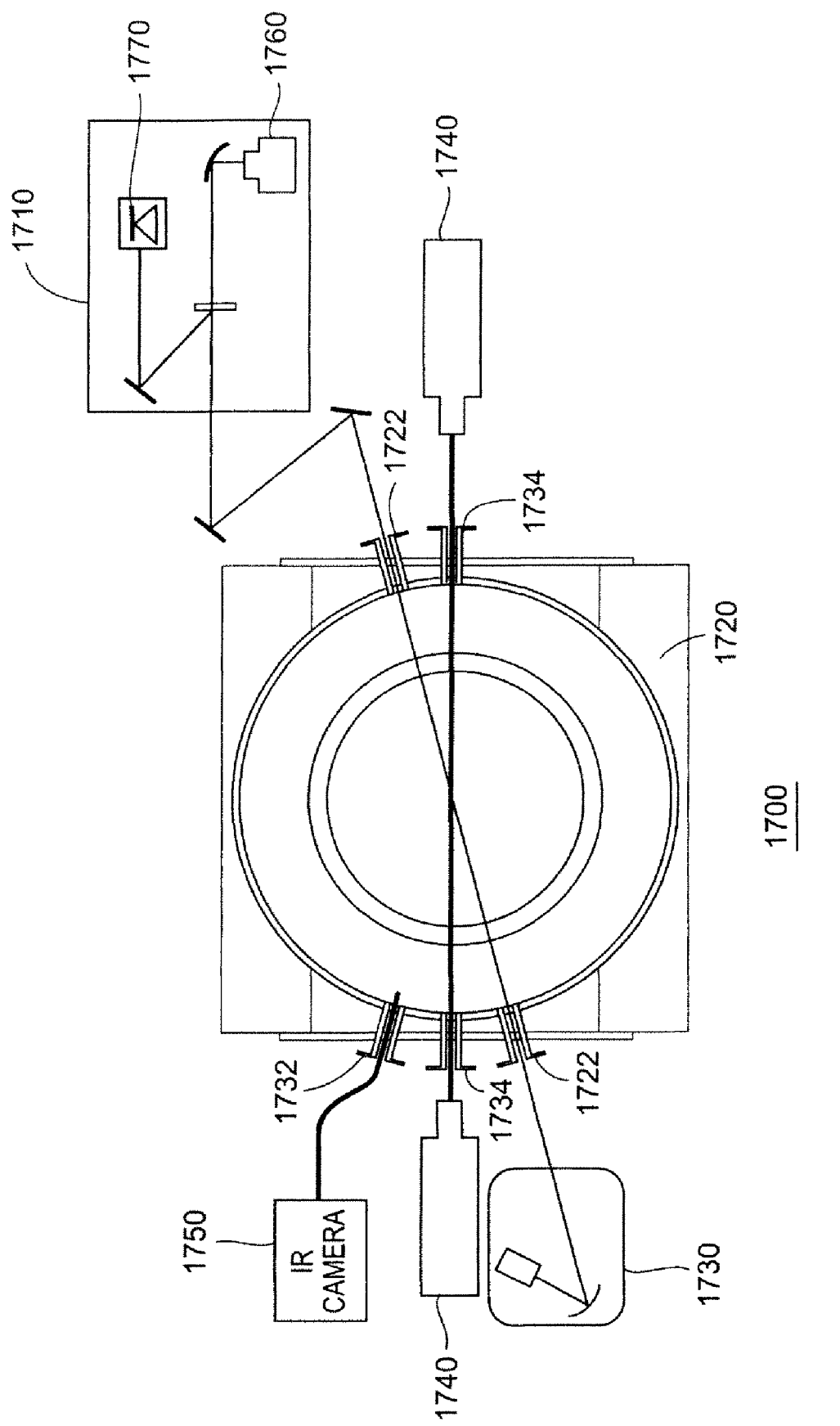
FIG. 17 is an illustration of a system for semiconductor process control, in which, to monitor the operation in the semiconductor growth chamber, light from a mid-IR fiber laser is coupled on one side, and on the other side the light after the chamber is coupled to a detector.

As an example, FIG. 17 illustrates a system 1700 using a mid-IR laser 1710 with a semiconductor growth chamber 1720. As shown, the chamber 1720 can have a number of windows, and a pair of the windows 1722 can be used for the mid-IR light to enter and exit. The light exiting the chamber can be incident on a detector 1730, which can be used for absorption spectroscopy. Additional windows 1732 and 1734 can include infrared cameras 1750, and spectrometers 1740, respectively. Network Analyzer may be coupled to the output windows as well. In another embodiment, a fiber lead may be used to introduce the mid-IR light into the chamber, and then a lens and fiber combination can be used to collect the light and direct the light to a detector.

The mid-IR laser 1710 may be any of the lasers systems described herein, and includes the laser source 1760 and wavelength/power detector 1770 which may be used as part of a closed loop feedback control of the source 1760.

Another example of an application of the mid-IR light source can be in combustion monitoring. For instance, most applications relevant to gas dynamic and combustion flows are usually based on absorption by low-molecular weight molecules with well resolved transitions. Example of gases include $O_2$, $H_2O$, CO, NO, $NO_2$, OH, $NH_3$, HF, $H_2S$, and $CH_4$. In current systems, absorption measurements are generally performed on overtone or combination vibration absorption bands. However, typical line strengths for these transitions are usually two or three orders of magnitude below the fundamental vibrational transitions in the mid-IR. Therefore, by using a mid-IR laser to perform the absorption measurements, there is the potential for much higher sensitivity because the vibrational and rotational lines are being measured at their fundamental transitions.

Figure 18:
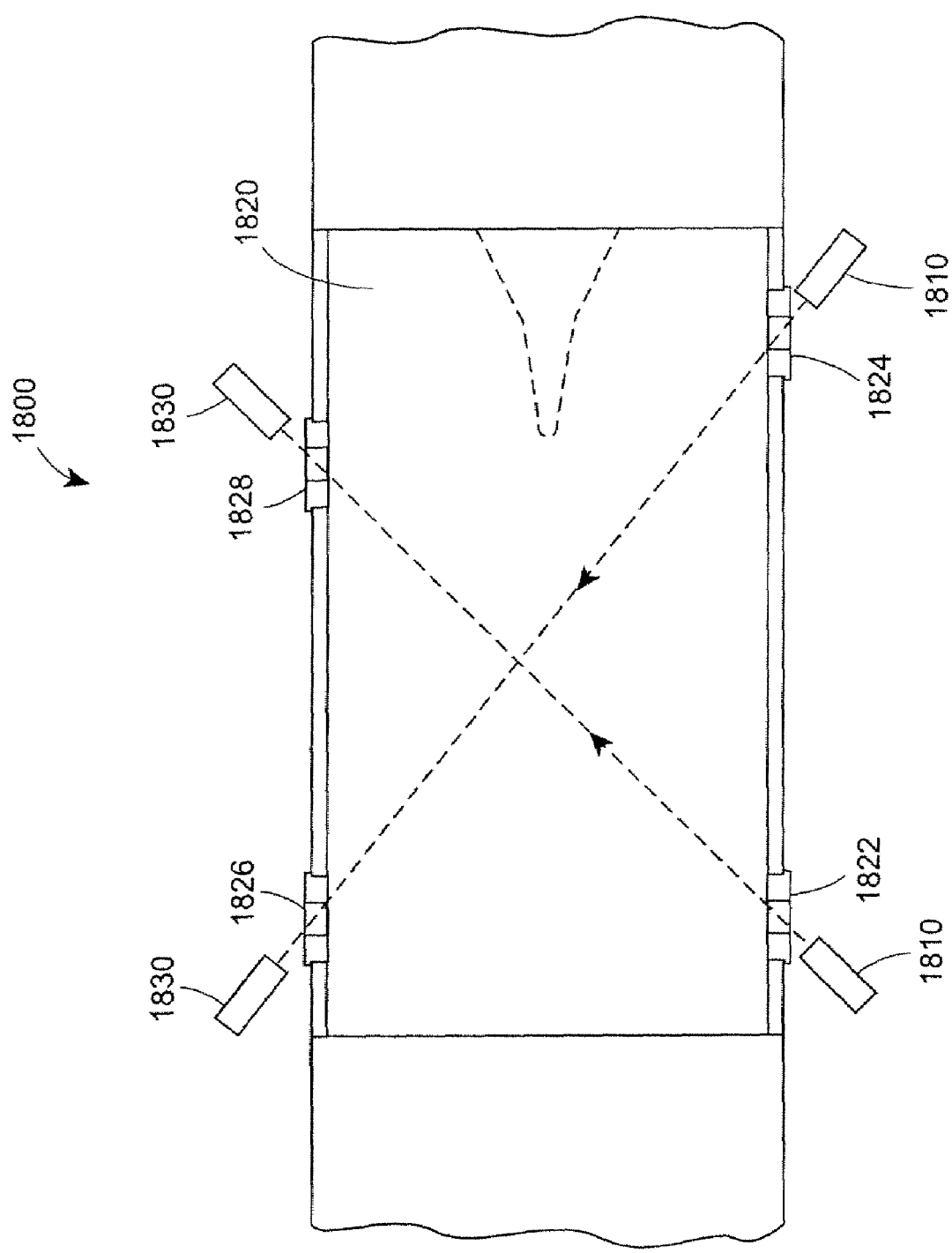
FIG. 18 is an illustration of a system for combustion monitoring in which to monitor the operation in the combustion chamber, light from a mid-infrared fiber laser is coupled on one side, and on the other side the light after the chamber is coupled to a detector.
Figure 19:
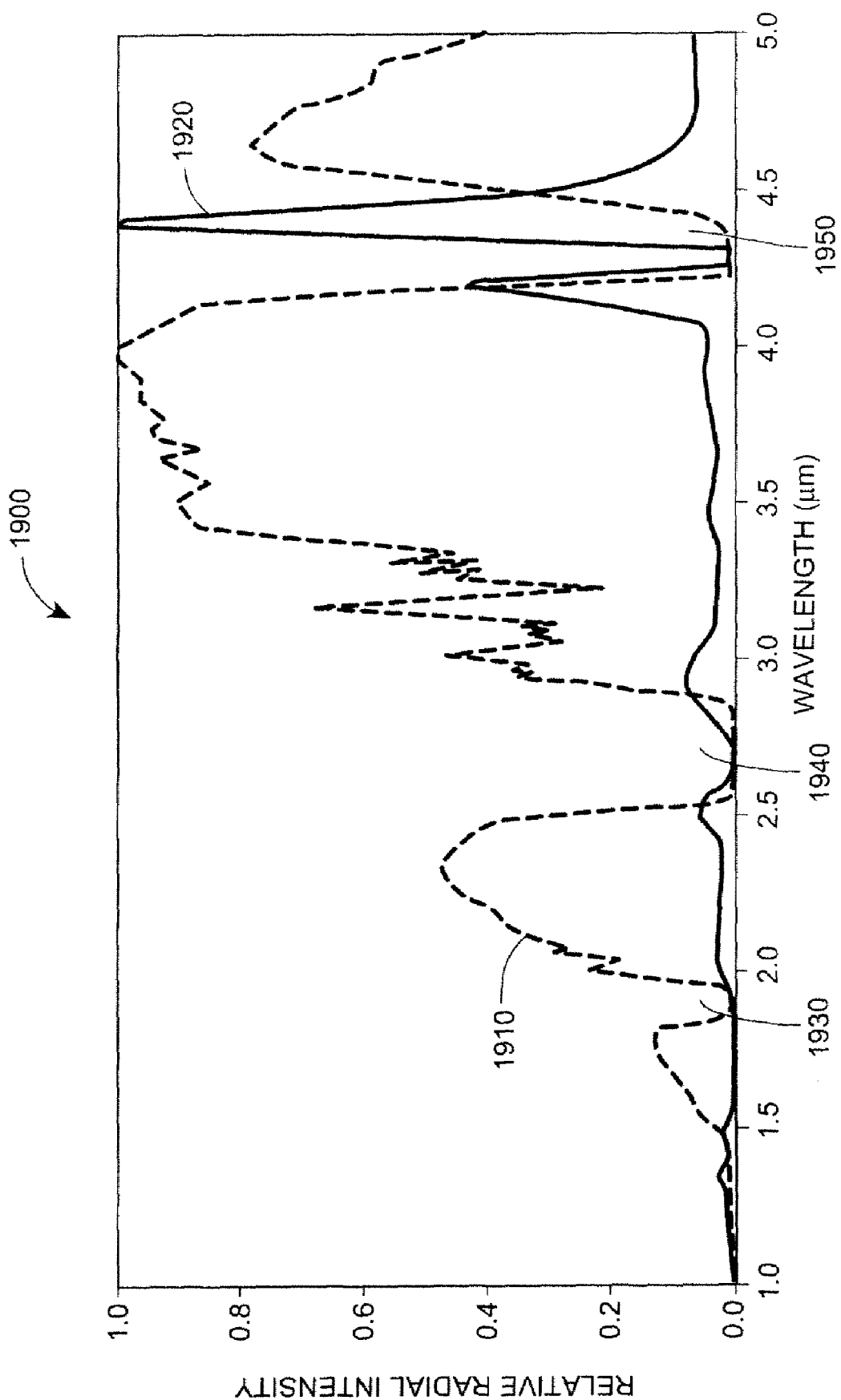
FIG. 19 is an example of the black body radiation from hot metal and plumes from an aircraft engine.

An exemplary system 1800 for performing combustion flow monitoring is illustrated in FIG. 18. For example, a glass-top engine 1820 may be used, having windows 1822-1828 placed within the combustion region. The windows may be anti-reflection coated. A flexible fiber optic cable may supply the pump beams to each of the mid-IR lasers 1810. Light from mid-IR lasers 1810 may propagate through one of the windows, and on the other side of the combustion chamber, the light can be observed by balanced ratiometric detectors (BRDs) 1830. Alternatively, fiber lines may transport the light to the windows 1822-1828, or a fiber optic cable might be placed inside of the combustion chamber. As an internal combustion engine goes through its cycles, absorption spectroscopy in the mid-IR can be used to observe the chemical species present in the chamber at different stages or parts of the cycle. The flow direction toward the engine 1820 is as shown.

More generally, chemical sensors can be implemented using the mid-IR fiber laser for detecting a wide range of atmospheric chemicals, many of which have their vibrational or rotational absorption in the mid-IR. This is one reason that the wavelength range is often referred to as the chemical fingerprint region. Applications of such detection systems can include environmental monitoring, chemical warfare agent detection, pollution control, explosives or weapons detection, etc.

Another potential application of the mid-IR fiber laser is to infrared countermeasures (IRCM). Most heat seeking missiles operate based on finding their target based on the black body radiation see plot 1900 from the hot engine 1910 or the heat associated with the engine plume 1920. The holes in the spectrum 1930, 1940, 1950 arise because the atmosphere does not transmit well at these wavelengths. Therefore, the laser used in IRCM usually has to provide energy in at least three bands: one from approximately 1.5 μm to approximately 2.5 μm, one from approximately 2.7 μm to approximately 3.5 μm, and another from approximately 3.7 μm to approximately 4.5 μm. Furthermore, since these lasers may reside on aircraft or helicopters, they must be lightweight, robust, and operate at room temperature.

A fiber-based mid-IR laser may serve as the light source for an IRCM system. As illustrated in the examples from FIGS. 10, 13 and 16, the mid-IR source based on cascaded Raman wavelength shifting is capable of covering one or all three wavelength bands. Furthermore, light can be tapped out at each of the three wavelengths, so that the CRO's can simultaneously provide all three wavelengths. The simulations also show that with a pump power of between 100 W and 1 kW, the output power at the longest wavelength can be in the range of 10 W. Typical IRCM systems in use today use approximately 3 W in each band. Finally, the output from the cascaded Raman wavelength shifting can either be pulsed or CW, whereas most current systems in use for IRCM are restricted to being pulsed.

Figure 20:
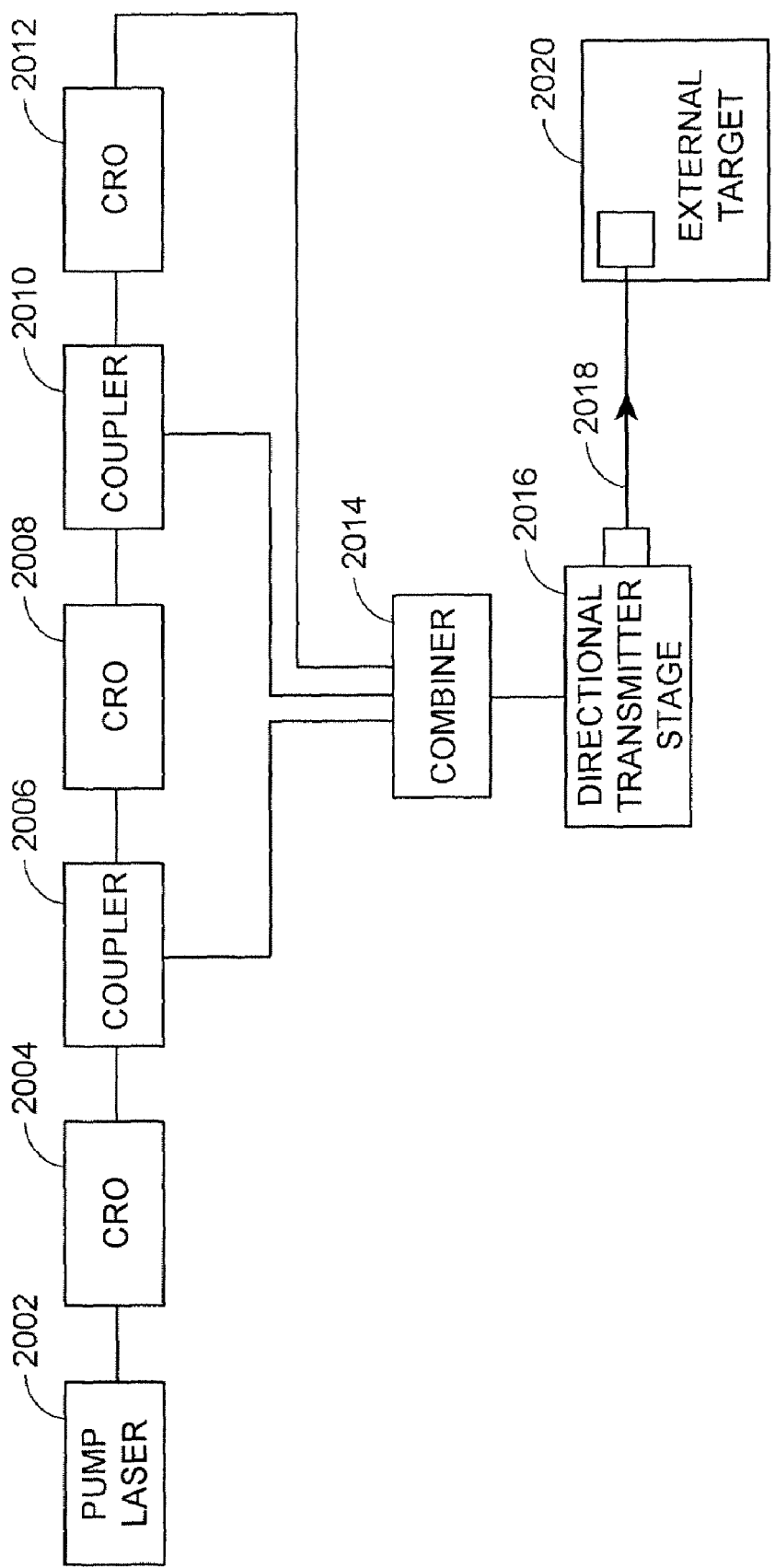
FIG. 20 is an illustration of a counter measure system using a cascaded Raman shifting process in accordance with an example herein.

FIG. 20 illustrates an example system 2000 that may be used in a countermeasure application. A pump laser 2002 provides a pump beam (e.g., at a wavelength of 0.8 to 2.5 μm) to a first CRO stage 2004 that produces an output beam at a wavelength of between approximately 1.5 μm and approximately 2.5 μm. A first coupler 2006 couples the output beam from stage 2004 to CRO stage 2008 which produces an output beam at a wavelength of between approximately 2.7 μm and approximately 3.5 μm. A second coupler 2010 couples the output beam from stage 2008 to CRO stage 2012 which produces an output beam at a wavelength of between approximately 3.7 μm to approximately 4.5 μm.

Each of the couplers 2006 and 2010 provide a portion of their respective output beams, along with the output beam from the CRO stage 2012 to beam combiner 2014 which is coupled to a directional transmitter stage 2016. That is, each of the couplers 2006 and 2010 have tapped portions which optically decouple a portion of the shifted light from the corresponding CRO to be combined with other shifted output signals. These taped portions may be standard optical couplers, e.g., a branch of a Y-splitter or more generally any evanescently-coupled N dB splitter, where N represents the desired amount of energy (in a decibel form) tapped from the output signal of the corresponding CRO. Under continual pumping by the laser 2002, that is pumping for a long enough time for all CROs to reach full Raman signal conversion and for all couplers to simultaneously output a tapped portions of their respective output signals, the combiner 2014 and the assembly 2016 operate to produce an overall mid-IR signal 2018 of a particular frequency signature depending on the individual output beam wavelengths from the CRO stages 2004, 2008, and 2012. This overall mid-IR signal can take on the characteristic spectrum of a desired object, for example that of a exhaust spectrum from an aircraft or other vehicle. The system 2000 may be adapted to produce a desired overall mid-IR spectral profile by adjusting various stage dependent variables such as the length of fibers forming the stages 2004, 2008, 2012, the number of Raman order shifts in each stage, the conversion efficiency of each stage, the coupling (i.e., output) efficiency of the taps for the various couplers. The overall mid-IR signal 2018 may be transmitted to an external target 2020 that includes an infrared seeking sensor system, as may be used guidance based system. While only three CRO stages are shown, if the infrared seeking system looks for characteristic spectral emissions at N number of different mid-infrared regions of the spectrum, then the system 200 may be formed with N number of CRO stages, each producing a different mid-IR wavelength output signal corresponding to one of the N spectral regions of interest at the external target.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. A mid-infrared laser beam source comprising:
a pump laser to produce a pump signal having a wavelength between 0.8 and 2.5 μm, the pump laser comprising a double-clad fiber with a doped core region coupled to a mode converter and a multiplexer to combine outputs from a plurality of laser diodes to form the pump signal;
a cascaded Raman oscillator apparatus coupled to receive the pump signal and having a plurality of stages each to produce a separate output signal at a different mid-infrared wavelength from each other stage and through a Raman wavelength shifting process, wherein each stage is to shift a separate input signal for the stage to a longer wavelength to produce the separate output signal, and wherein each separate output signal corresponds to a different portion of a mid-infrared spectrum;
a coupler apparatus to produce a signature spectral profile comprising tapped portions of the separate output signals; and
a directional stage to direct the signature spectral profile to an external target.

2. The mid-infrared laser beam source of claim 1, wherein the external target includes an infrared seeking sensor system, and wherein the plurality of stages are to produce the separate output signals at power levels and mid-infrared wavelengths to affect the infrared seeking sensor system.

3. The mid-infrared laser beam source of claim 1, wherein the infrared seeking sensor system has N number of mid-infrared sensor regions, the laser beam source comprising N or fewer numbers of cascaded Raman oscillator stages each to produce one of the separate output signals at a wavelength within one of the mid-infrared sensor regions, where N is an integer greater than 1.

4. The mid-infrared laser beam source of claim 3, wherein N is 3, and wherein a first cascaded Raman oscillator stage is to produce a first separate output signal at a mid-infrared wavelength between 1.5 to 2.8 μm, a second Raman oscillator stage to produce a second separate output signal at a mid-infrared wavelength between 2.7 to 3.6 μm, and a third Raman oscillator stage is to produce a third separate output signal at a mid-infrared wavelength between 3.7 to 4.8 μm.

5. A method of producing an overall output mid-infrared signal having frequency components at separate regions of a mid-infrared spectrum, the method comprising:
generating through a pump laser a pump signal having a wavelength between 0.8 and 2.5 μm, wherein in the pump laser comprises a double-clad fiber with a doped core region coupled to a mode converter and a multiplexer to combine outputs from a plurality of laser diodes to form the pump signal;
supplying the pump signal to a first one of a plurality of cascaded Raman oscillator stages that each produce a separate output signal at a different output wavelength in response to a separate input signal coupled to that stage, wherein each stage applies a Raman wavelength shifting process to the separate input signal coupled to that stage, and where at least one of the stages is capable of producing its separate output signal at a wavelength longer than 2 μm;
supplying the separate output signal from one stage as the separate input signal to another stage; and
each stage producing one of the frequency components such that under continual pumping of the pump signal the combined separate output signals from the stages form the overall output mid-infrared signal.

6. The method of claim 5, wherein the at least one of the stages capable of producing its separate output signal at a wavelength longer than 2 μm is formed of a material selected from the group consisting of chalcogenide, fluoride, semiconductor and tellurite.

7. The method of claim 5, wherein the frequency components of the overall output mid-infrared signal correspond to a predetermined heat signature, the method further comprising:
directing the overall output mid-infrared signal to an external target to provide the predetermined heat signature to the external target.

8. The method of claim 7, further comprising directing the overall output mid-infrared signal to the external target to affect an infrared seeking sensor system of the external target.

9. The method of claim 5, wherein frequency components of the overall output mid-infrared signal correspond to a first mid-infrared wavelength region between 1.5 to 2.8 μm, a second a mid-infrared wavelength region between 2.7 to 3.6 μm, and a third mid-infrared wavelength region between 3.7 to 4.8 μm.

10. The mid-infrared laser beam source of claim 1, wherein the coupler apparatus comprises one or more taps, with each of the one or more taps comprising a coupling efficiency, and wherein the coupling efficiencies of the one or more taps are adjusted to produce a desired overall mid-infrared spectral profile.

11. The method of claim 5, further comprising tapping the separate output signals from the plurality of cascaded Raman oscillator stages, wherein each of the tapping of the separate output signals comprises a coupling efficiency, and wherein the coupling efficiencies are adjusted to produce a desired overall mid-infrared spectral profile.

* * * * *